US007024470B2

(12) United States Patent
Bellinger et al.

(10) Patent No.: US 7,024,470 B2
(45) Date of Patent: Apr. 4, 2006

(54) SYSTEM AND METHOD FOR SETTING UP USER SELF-ACTIVATING NETWORK-BASED SERVICES

(75) Inventors: Douglas Bellinger, Ottawa (CA); Richard Burke, Vanier (CA); Thomas Phillips, Ottawa (CA); Antonino Argentina, Gloucester (CA); Andrea Baptiste, Ottawa (CA); Gaetan Delahousse, Ottawa (CA); Geoff Stewart, Ottawa (CA); Wendy Raoux, Ottawa (CA); Luc Richard, Greely (CA); Stephanie Bazin, Ottawa (CA); Scott Brookes, Ottawa (CA); Patrick Rhude, Dunrobin (CA)

(73) Assignee: Atreus Systems Corp., Ottawa (CA)

( * ) Notice: Subject to any disclaimer, the term of this patent is extended or adjusted under 35 U.S.C. 154(b) by 722 days.

(21) Appl. No.: 10/213,043

(22) Filed: Aug. 5, 2002

(65) Prior Publication Data

US 2003/0149751 A1    Aug. 7, 2003

Related U.S. Application Data

(60) Provisional application No. 60/354,268, filed on Feb. 4, 2002.

(51) Int. Cl.
*G06F 15/77*    (2006.01)
(52) U.S. Cl. ..................................... 709/220
(58) Field of Classification Search ................. 705/220
See application file for complete search history.

(56) References Cited

U.S. PATENT DOCUMENTS

| 5,926,104 | A | * | 7/1999 | Robinson ............... 340/825.22 |
| 6,363,411 | B1 | * | 3/2002 | Dugan et al. ............... 709/202 |
| 6,449,650 | B1 | * | 9/2002 | Westfall et al. ............. 709/228 |
| 6,753,887 | B1 | * | 6/2004 | Carolan et al. ............. 715/764 |
| 2002/0046255 | A1 | * | 4/2002 | Moore et al. ............... 709/218 |
| 2003/0065789 | A1 | * | 4/2003 | Meghashyam et al. ..... 709/228 |

* cited by examiner

*Primary Examiner*—Zarni Maung
*Assistant Examiner*—Alan S. Chou
(74) *Attorney, Agent, or Firm*—Silicon Edge Law Group LLP; T. Lester Wallace; Darien K. Wallace

(57) ABSTRACT

A system and method automates and simplifies tasks associated with setting up a user self-activating network-based service. A configurable input engine is configured to define the service. The service may, for example, use a plurality of networking devices and/or computing devices. After the service is defined, an offer of the service is published to a user. The offer includes values of commercial terms and/or values of configuration parameters associated with the offer. Upon receiving an acceptance of the offer from the user, the configurable input engine automatically generates activations for the devices to be used by the service. The activations are sent to policy distribution points (PDPs) where the activations are translated into device-specific instructions. The device-specific instructions are in turn sent to the devices (networking devices and/or computing devices) to be configured. The device-specific instructions configure the devices, thereby automatically setting up the service for the user.

21 Claims, 24 Drawing Sheets

SERVICE CREATION PROCESS

DRIVER CREATION AND CONFIGURATION

DRIVER CREATION AND
CONFIGURATION

USER CONFIGURATION

FIG. 8

DEFINING PUBLICATION RULES

DEFINING PUBLICATION RULES

DEFINING PUBLICATION RULES

DEFINING SUBSCRIPTION RULES

DEFINING SUBSCRIPTION RULES

DEFINING SUBSCRIPTION RULES

DEFINING REGISTRATION RULES

DEFINING REGISTRATION RULES

DEFINING REGISTRATION RULES

DEFINING AN OFFERING

USING THE CONFIGURABLE INPUT
ENGINE TO GENERATE A POLICY
(PUBLICATION)

|  | Services Available for Subscription | | Total: 4 of 4 |
|---|---|---|---|
| Subscribe | Currently Subscribed Services | | |
| | Available Services ↓ | Description | |
| 1 | Netopia | TBD | |
| 2 | ☑ Road Warrior VPN | TBD | |
| 3 | Secure VPN | TBD | |
| 4 | Web Mail | TBD | |
| Subscribe | Currently Subscribed Services | | |

USING THE CONFIGURABLE INPUT
ENGINE TO GENERATE A POLICY
(SUBSCRIPTION)

FIG. 20

Confirmation of Service Subscriptions — 566

Services Selected for Subscription

| | Services | |
|---|---|---|
| 1 | ☑ Road Warrior VPN | 49.95 |

Terms of Use:

You have chosen to subscribe to the services(s) listed above. Once you accept the terms of use, charges as described will be invoiced to the following company:

Anyco Limited
Contact: Joseph P. Johnston, System Administrator
2035 12th Ave. South
San Jose, CA 12345

All content and software (if any) that is made available to view and/or download in connection with the ServiceProviderCo Sites/Services, excluding content and/or software that may be made available by end-users through a Communication Service, ("Software") is owned by and is the copyrighted work of ServiceProviderCo Corporation and/or its suppliers and is protected by copyright laws and international treaty provisions. Your use of the Software is governed by the terms of the end user license agreement, if any, which accompanies or is included with the Software ("License Agreement"). You may not install or use any Software that is accompanied by or includes a License Agreement unless you first agree to the License Agreement terms. Any reproduction or redistribution of the content and/or Software is expressly prohibited by law, and may result in severe civil and criminal penalties. Violators will be prosecuted to the maximum extent possible. You acknowledge that the Software, and any accompanying documentation and/or technical information, is subject to applicable export control laws.

[ I Accept These Terms ] [ Cancel ]
567

USING THE CONFIGURABLE INPUT ENGINE TO GENERATE A POLICY (SUBSCRIPTION)

FIG. 21

USING THE CONFIGURABLE INPUT
ENGINE TO GENERATE A POLICY
(REGISTRATION)

USING THE CONFIGURABLE INPUT
ENGINE TO GENERATE A POLICY
(REGISTRATION)

SYSTEM AND METHOD FOR SETTING UP USER SELF-ACTIVATING NETWORK-BASED SERVICES

CROSS REFERENCE TO RELATED APPLICATION

This application claims the benefit under 35 U.S.C. §119 of provisional application Ser. No. 60/354,268, entitled "Software Platform For Managing Network-Based Services", filed Feb. 4, 2002. The subject matter of provisional application Ser. No. 60/354,268 is incorporated herein by reference.

TECHNICAL FIELD

The present invention relates to setting up network and application services that a user can self-activate.

CROSS REFERENCE TO COMPACT DISC APPENDIX

Compact Disc Appendix, which is a part of the present disclosure, is one recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BACKGROUND

Network-based services are often provided over networks, such as a company's own private telecommunications network, the network of a public telephone company, or the internet. In order to provide services to users on these networks, the specific hardware devices and specific software applications needed for the services are configured.

This is typically done by engaging various skilled technicians to configure devices and/or applications each time a user subscribes to a network-based service. Information from various sources, including user databases, customer relationship management (CRM) systems and billing systems, is cobbled together to configure the devices and applications and to set up the service. This configuring of devices and assembling of information can be a fairly manual, time-intensive task.

Not only is the setting up of such a service for the first user a time-intensive task, but significant amounts of time are also involved in setting up the service for subsequent users. Software code used to set up a service is generally not written in a modular form that is easily reusable to configure additional services for similar devices, applications or users. To provision an additional service to a new or existing user, a system administrator might set up an account for the user by accessing a customer relationship management (CRM) system, a user database and a billing system. Once the user account is set up, the system administrator might, for example, send a facsimile message to a technician instructing the technician to locate a particular piece of equipment and to provision that device. If the equipment is already installed at the location of the user in the field, then the equipment configuring may occur remotely over the network without the need for a technician to go to the location of the equipment.

Thus, setting up a service involving networking devices and computing devices conventionally may involve multiple steps in which system administrators and technicians access multiple systems to configure the necessary networking devices and computing devices. In the event a service for a second user (or another service for the same user) is to be set up, this often time-intensive process is repeated. A system is therefore sought that eliminates cost, time and complexity associated with setting up such services. A system that allows users to self-activate network and computing services is desired.

SUMMARY

A system and method automates and simplifies tasks associated with setting up network-based-services. The method allows a user to self-activate a network-based service. In some embodiments, the service involves using both a computing device as well as a networking device.

In accordance with some embodiments, the system involves a configurable input engine. System administrators use a graphical user interface to configure the configurable input engine so as to define the user self-activating service. The graphical user interface is also used to define how an offer of the service will be published to potential users (the offer may include the value of a commercial term and the value of a configuration parameter), and to define what the system will do when it receives an acceptance of the offer from a user.

When the system receives an acceptance of the offer, the configurable input engine generates activations in the form of XML documents and sends them to policy distribution points (PDPs). A PDP translates an activation into device-specific instructions understood by the particular networking device and/or computing device to be configured. The networking device and/or computing device receives the translated activations and is configured, thereby automatically setting up the user self-activating service.

Once the user self-activating service has been defined and published to the potential users, no more manual input on the part of system administrators and/or technicians is required. When a user selects an offered service (for example, by clicking on an icon or button), the input engine automatically generates the activations needed to set up the user self-activated service.

This summary does not purport to define the invention. The invention is defined by the claims.

BRIEF DESCRIPTION OF THE DRAWINGS

The accompanying drawings, where like numerals indicate like components, illustrate embodiments of the invention.

FIG. 8 is a screenshot taken from step 201 in which user information is input.

FIGS. 20–21 are screenshots taken from substep 210 in which the configurable input engine is run to allow users to subscribe to service offerings.

DETAILED DESCRIPTION

Figure 1:
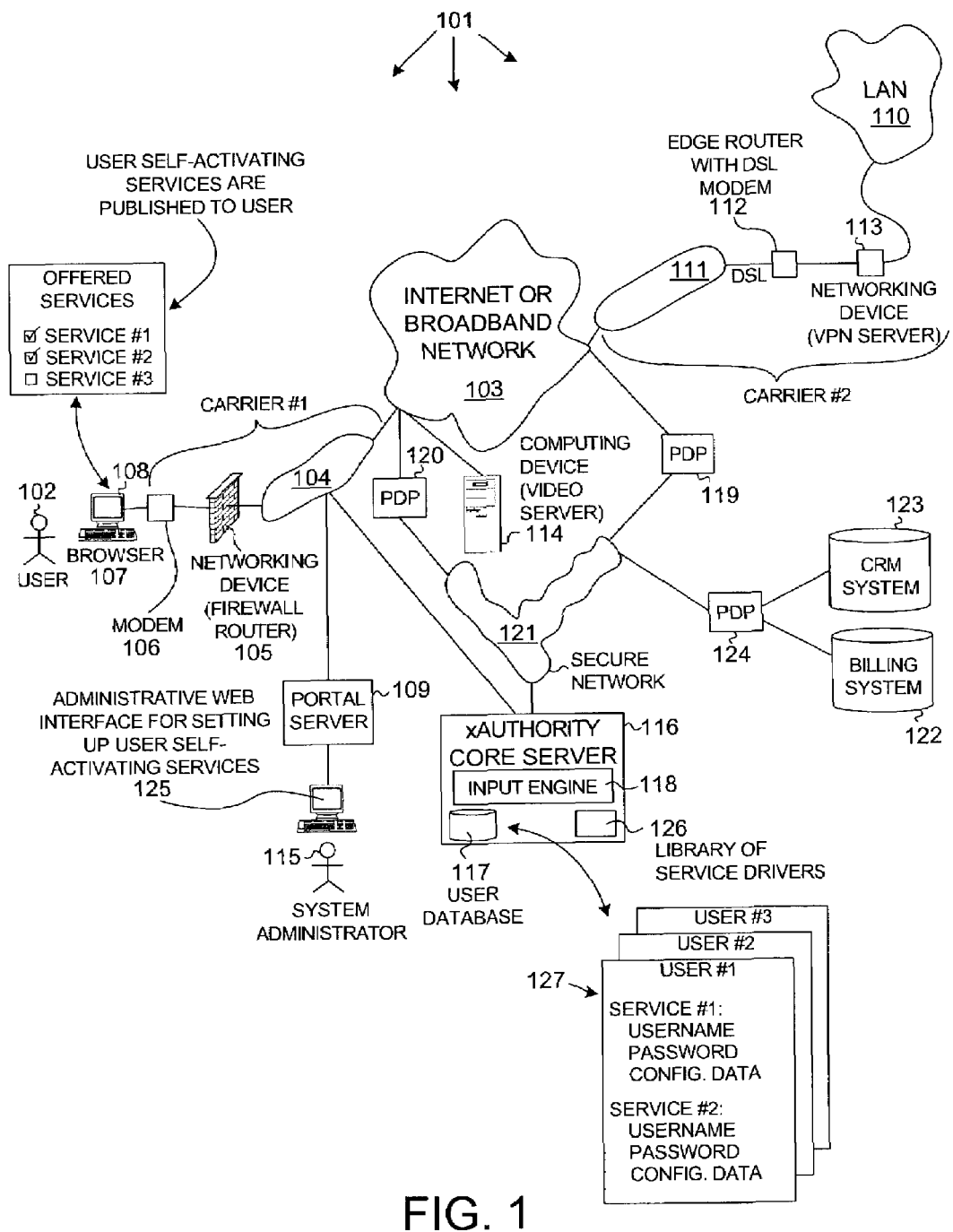
FIG. 1 is a simplified diagram of a system for setting up network-based services in accordance with some embodiments of the present invention.

Reference will now be made in detail to some embodiments of the invention, examples of which are illustrated in the accompanying drawings. FIG. 1 is a diagram of a system 101 in accordance with some embodiments of the present invention. A first carrier (carrier #1) provides a user 102 with access to the internet 103 via the first carrier's network 104, through firewall router 105 to modem 106. To self-activate a service, the user 102 accesses web pages via a browser 107 executing on the user's computer 108. The web pages are served up by portal server 109. In this example, the first carrier is an internet service provider that desires to sell to user 102 two services in addition to internet access, for example a "networking service" and a "computing service".

In a first example illustrated below, the "networking service" is a VPN (virtual private network) service that provides secure communications from user's computer 108 to another computer, on a local area network (LAN) 110. Access to LAN 110 is provided via a network 111 of a second carrier (carrier #2), an edge router 112 having a DSL modem, and a VPN server 113. Carrier #2 may, for example, be a local telephone company such as, for example, Bell Canada.

In a second example, the "computing service" is access to streaming video made available from a video server 114, which is a computing device. The streaming video is supplied from the computing device 114, through internet 103, through network 104, through firewall router 105, through modem 106 to the computer 108 of user 102. Setting up the streaming video service involves configuring (sometimes referred to as "provisioning") the video server 114. In addition, the firewall router 105 is configured to allow the video to pass through the firewall to user 102.

Figure 2A:
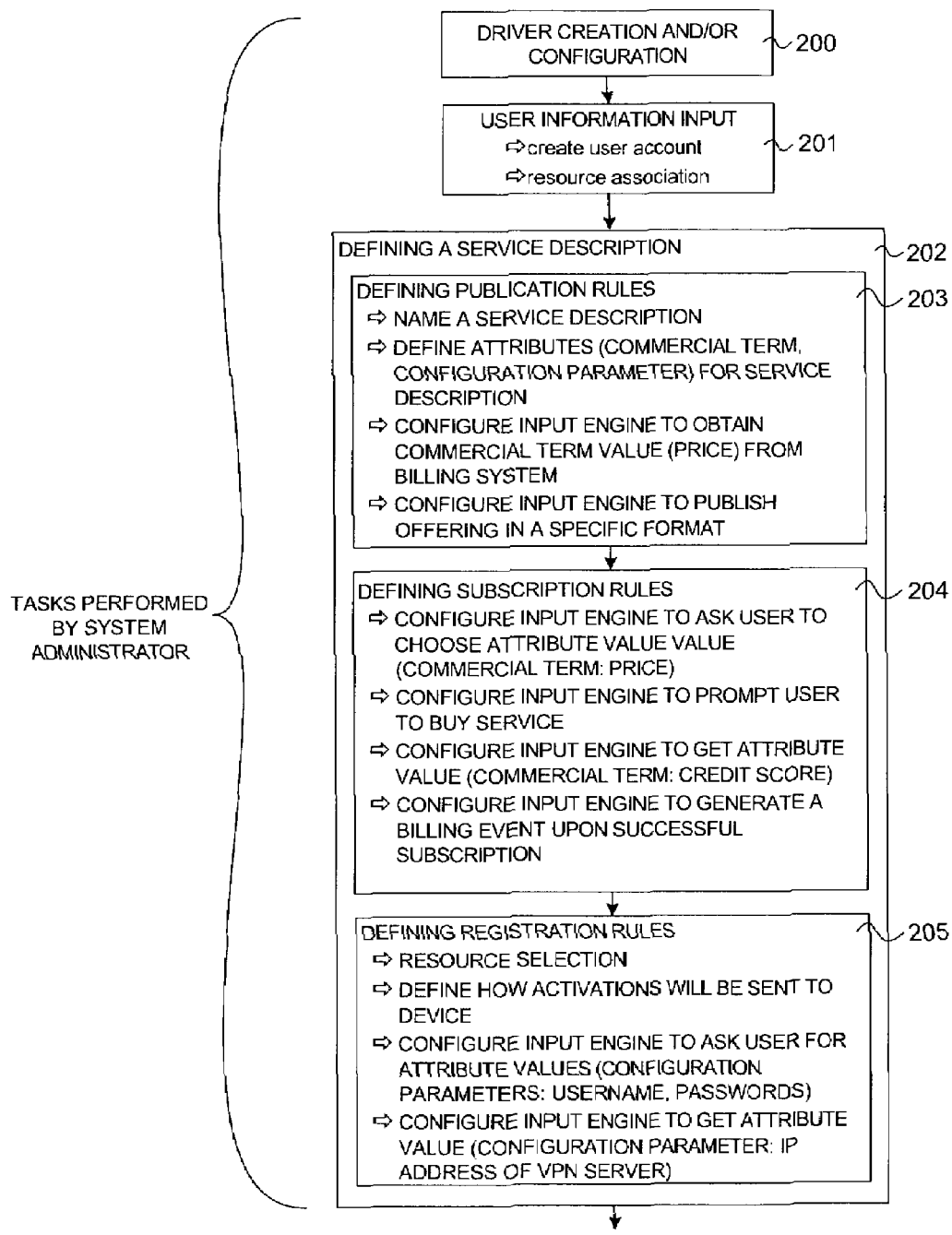
FIGS. 2A and 2B are a flowchart of a "service creation process" aspect in accordance with a specific embodiment of the present invention.
Figures 2, 2B:
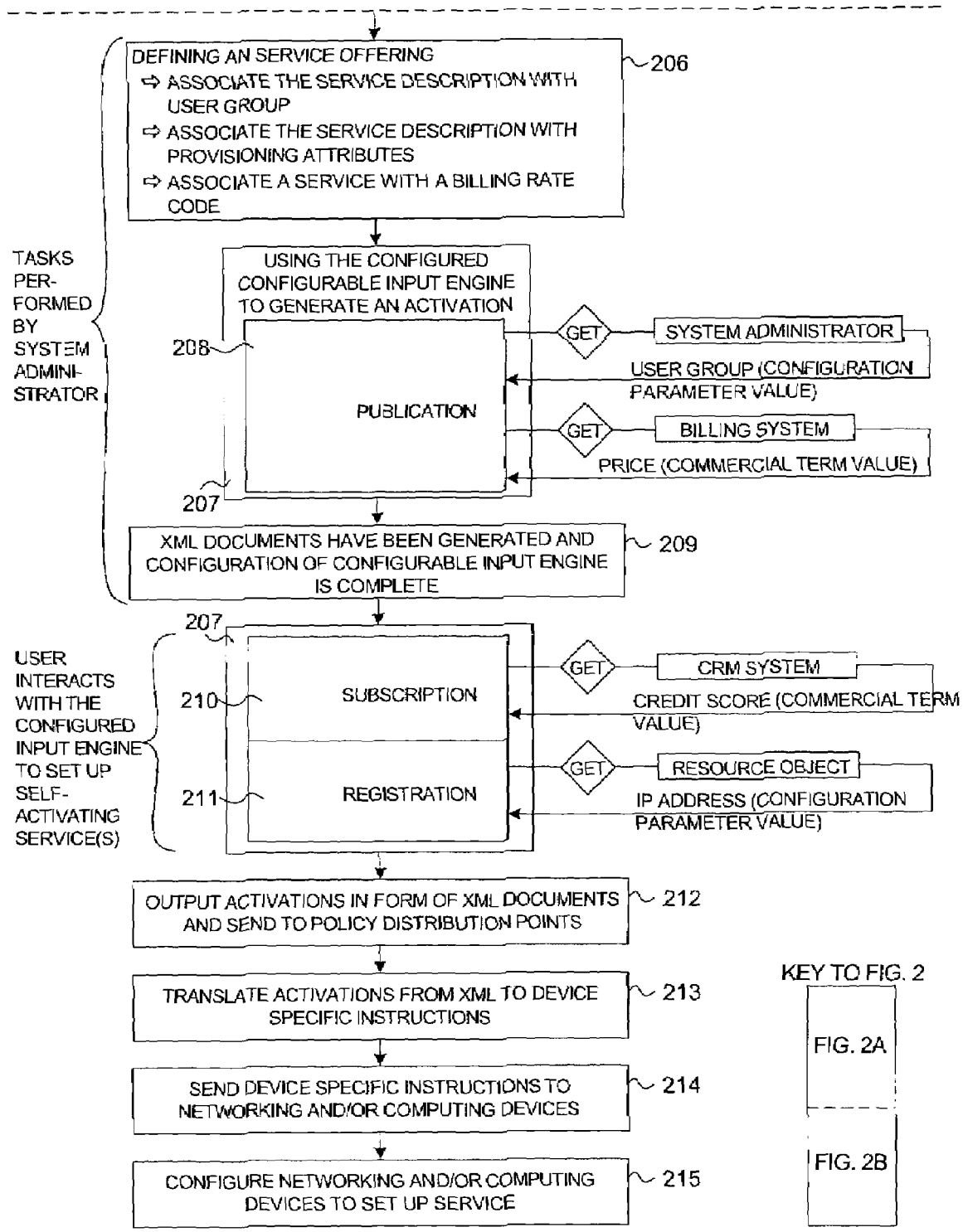

FIG. 2 is a flowchart showing steps in a "service creation process" in accordance with a specific embodiment of the invention. Once the internet service provider (for example, carrier #1 in FIG. 1) has conceived of a service to be offered to end-users (for example, user 102), a system administrator 115 of the internet service provider (ISP) accesses xAuthority core server 116. For this purpose, a configurable input engine 118 of the xAuthority core server 116 provides an administrative web interface (a graphical user interface) 125 that is served up by portal server 109. (For FIGS. 1–5, numerals 100–199 refer to components in FIG. 1, numerals 200–299 refer to components in FIG. 2, and so forth; some components are referred to in more than one figure.) The system administrator 115 creates and/or configures one or more service drivers (step 200 in FIG. 2) for each device used to deliver the service.

After the service drivers are created and/or configured, the system administrator 115 inputs user information (step 201 of FIG. 2) into the user database 117 of the xAuthority core server 116 and thereafter defines a service description (step 202). An example of a service description is virtual private network (VPN) service. The process of defining a service description (step 202) involves configuring the configurable input engine 118 in three substeps: publication, subscription and registration (substeps 203, 204 and 205, respectively).

Once the service description has been defined, then the system administrator 115 defines a service offering (step 206). An example of a service offering is VPN service for $49.95 per month. The steps of defining service descriptions and service offerings involve defining actions, which are commands that the input engine performs when it is run.

In step 207, the configured input engine 118 is run, and the actions configured in substeps 203, 204 and 205 (publication, subscription and registration) are executed.

Carrying out step 202 results in a service description object being formed. In step 206, a service offering object is formed as a child to the parent service description object. In step 208, a service publication object is formed as a child to the service offering object. All of these objects are composed of XML documents.

The configurable input engine 118 produces activations (step 212) in the form of XML documents that configure the devices used to provide a service. An activation object contains the required configuration information for a specific service for one user to run on a specific device. Where a service for one user requires more than one device, more than one activation is generated. The input engine 118 sends each activation to a policy distribution point (PDP) 119, 120, 124. A PDP in turn translates an activation from XML into machine-readable, device-specific instructions (step 213) specific to the device being configured. An activation sent to a VPN server can be translated, for example, into command line interface (CLI) over a telnet protocol. An activation sent to a firewall router can be translated into HTML, and an activation sent to a video server can be translated into SSH. Then each PDP 119, 120, 124 sends device specific instructions to the relevant device, for example, VPN server 113.

Set Up of First Service (VPN Service)

In the following example, the service provider (carrier #1 in FIG. 1) offers a service to user 102 that consists of secure access in a virtual private network (VPN) between the computer 108 of user 102 and another computer on LAN 110. To set up such a VPN service and to configure VPN server 113, information relating to user 102 and the defined service is used.

The system administrator 115 of the service provider defines the characteristics of the VPN service that will be offered to user 102 by creating and/or configuring a service driver (step 200 in FIG. 2) for each type of device that is used to deliver the VPN service. In this example, the service driver is a software module resident on PDP 119. Ideally, PDP 119 is placed in close physical proximity to VPN server 113 in order to limit the exposure of the device specific instructions to non-secure network paths as they travel from PDP 119 to VPN server 113. Alternatively, PDPs can be located locally at the ISP's site to manage application servers, as well as at or near user sites to manage local networking resources and/or computing resources. PDPs can reside on their own device, on the networking and computing devices they manage, such as the VPN server 113, or even on the core server 116. (For more information on PDPs, see provisional application Ser. No. 60/354,268, pp. 18, 39, 85).

The service creation process begins with the system administrator 115 accessing the xAuthority core server 116 by logging on to an administrative web interface (graphical user interface) 125 on portal server 109. The xAuthority core server 116, in turn, communicates with the PDP 119 over a secure network 121, so that an appropriate service driver for the device being configured is installed on PDP 119. (For more information on the service creation process, see prov. app. Ser. No. 60/354,268, pp. 34, 41, 330).

Figure 3:
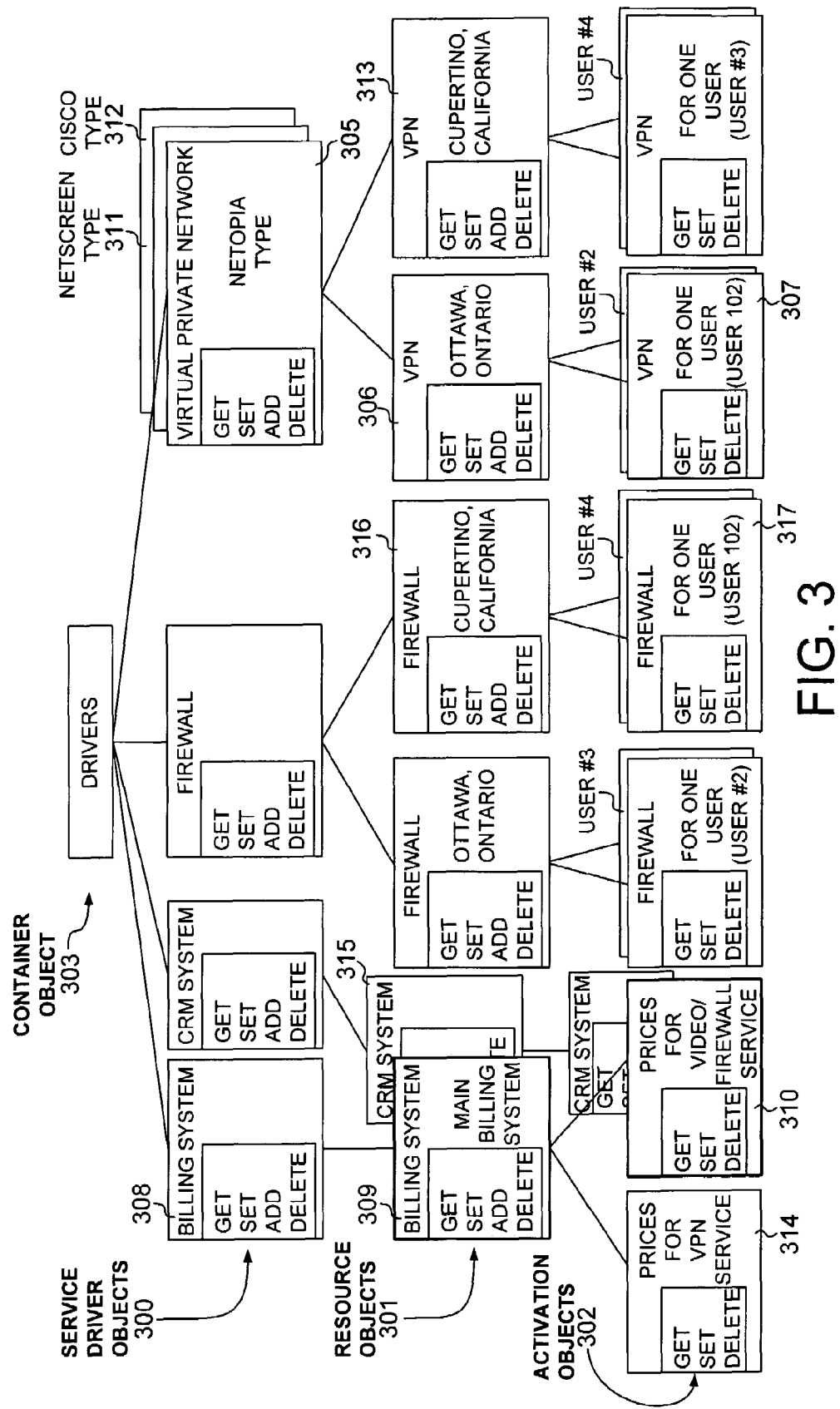
FIG. 3 is a tree showing the relationship between service drivers used by the system.

FIG. 3 shows the three types of objects modeled by service drivers: service driver objects 300, resource objects 301 and activation objects 302. (For more information on objects, see prov. app. Ser. No. 60/354,268, p. 160). Each service driver object 300 is accessed through a container object 303. For the VPN service in this example, the system administrator 115 creates a VPN driver object 305, as well as an associated resource object 306 (a child object) for the particular VPN server networking device 113 used by carrier #2 to provide access to LAN 110 in Ottawa. An activation object 307 is automatically created later by the input engine 118 during the registration stage of step 207 when the input engine is run.

Service drivers can be configured using four actions: GET, SET, ADD and DELETE. By executing the ADD action on an object, the system administrator 115 can add an object below that object. The system administrator 115 can delete an object by executing the DELETE action on the object itself. Activation objects have no ADD action because no child object can be linked below an activation object. An object can be configured to retrieve information by using the GET action. (For more information on actions (also called operations), see prov. app. Ser. No. 60/354,268, pp. 158, 172).

The activation object 307 associates user 102 with the resource object 306 corresponding to VPN server 113. A service driver object 300 is also created for each operational support system (OSS) that the service uses. In the present example, service driver objects are created to interface with a billing system 122 and a CRM system 123. Service driver, resource and activation objects associated with operational support systems function as service adaptors and are not associated with users. Nevertheless, service driver objects and service adaptors use the same basic software structure. In our example, a service driver object 308 is created for the generic billing system type used by carrier #1, and an associated resource object 309 is created for the particular physical billing system of carrier #1. An activation object 310 is automatically created later for the VPN service offered to user 102 upon running the input engine 118 (step 207).

Individual service driver objects and resource objects need be created and configured only once. Thereafter, they are stored in the xAuthority core server 116 or in the core server's library of service drivers 126, from which the system administrator 115 may retrieve them and install them on the appropriate PDP.

Figure 6:
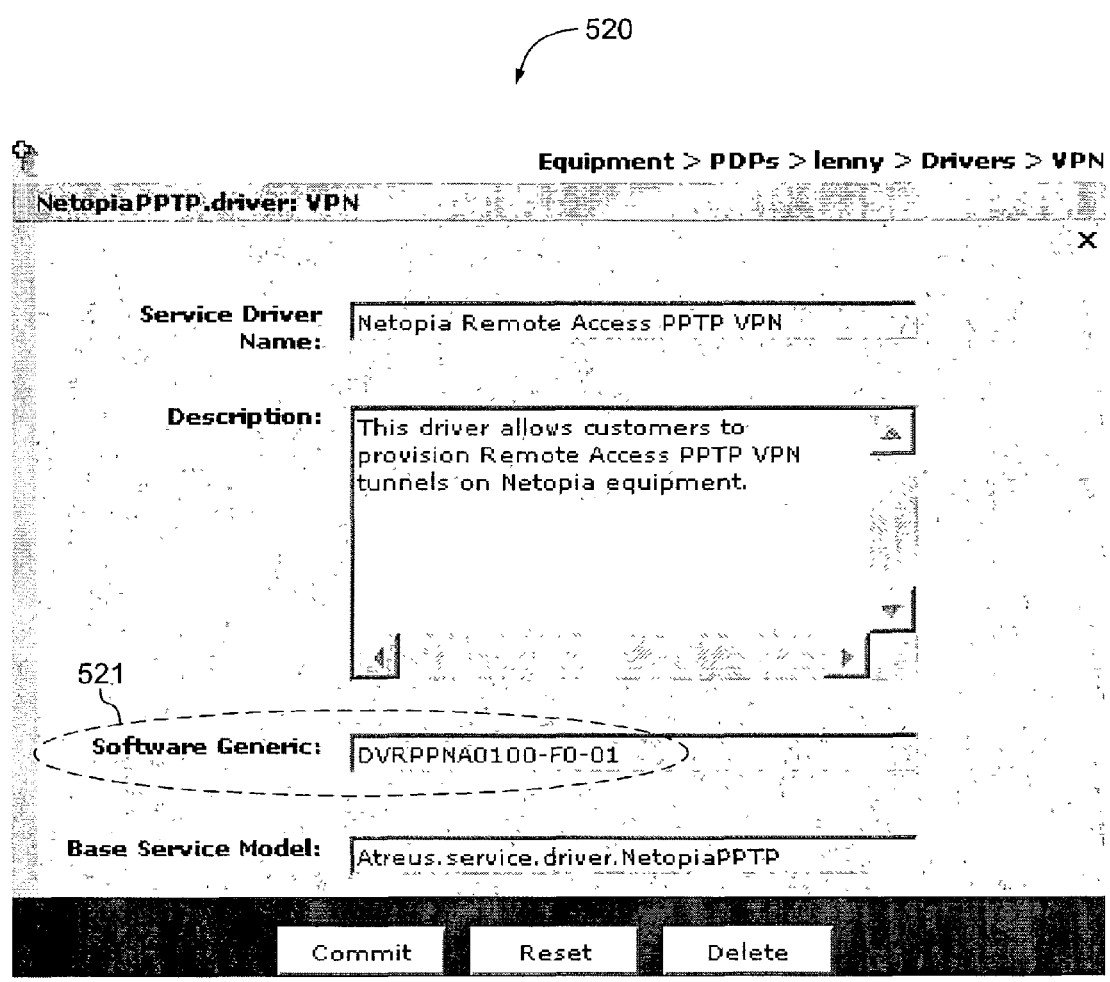
FIGS. 6–7 are screenshots taken from step 200 in which service drivers are created and configured.

FIG. 6 shows a screen shot of the administrative web interface 125 of the xAuthority system for setting up network and application services. FIG. 6 shows a passive screen 520 representing a service driver object for a VPN server 305, which in our example has already been configured for a server manufactured by Netopia. The system administrator 115 can simply locate the service driver object represented by screen 520 from the service driver inventory in the service driver library 126, and does not need to recreate the Netopia VPN service driver object 305. The service driver library might also contain service driver objects for VPN servers manufactured by Netscreen 311, Cisco 312, Efficient Networks or Nortel, for example. In FIG. 6, the software generic number 521 identifies the software code that is the Netopia VPN service driver object 305.

Figure 7:
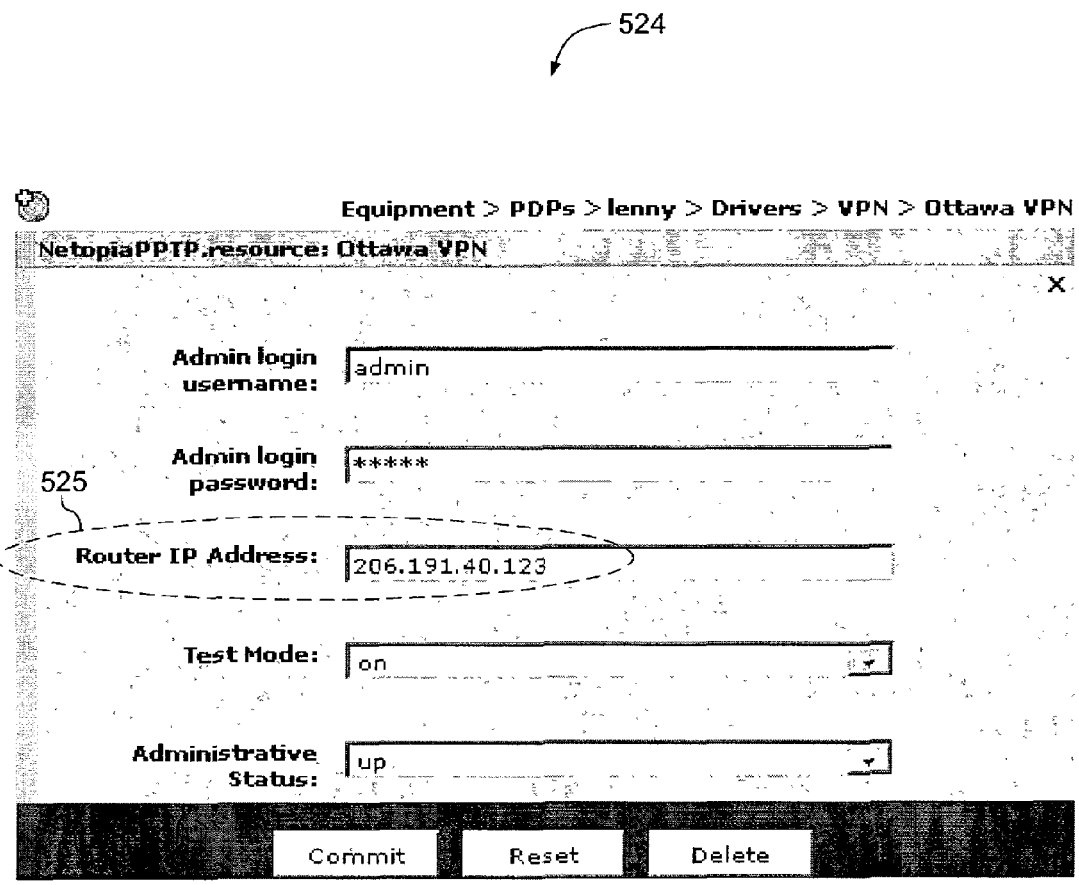

FIG. 7 shows a screen 524 representing a resource object 306 for a particular VPN server in Ottawa. The system administrator 115 configures the resource object 306 through the administrative web interface 125 by, for example, adding the IP address of the VPN server in Ottawa to field 525 on screen 524. If this resource object already exists in the xAuthority core server 116 and is correctly configured, the system administrator does not need to recreate it to provide the VPN service in this example. In this example, the core server 116 also contains resource objects 306 and 313 for distinct Netopia VPN servers located in Ottawa and Cupertino, respectively.

In step 201, the system administrator 115 next creates a user account in the user database 117 on the core server 116 and inputs information relating to user 102 into the user account. The user information includes, for example, information indicating those specific devices that can possibly be used to deliver any service to a specific user. In this example, the Netopia VPN server in Ottawa 113 is made available to all employees of the company that employs user 102.

Figure 8:
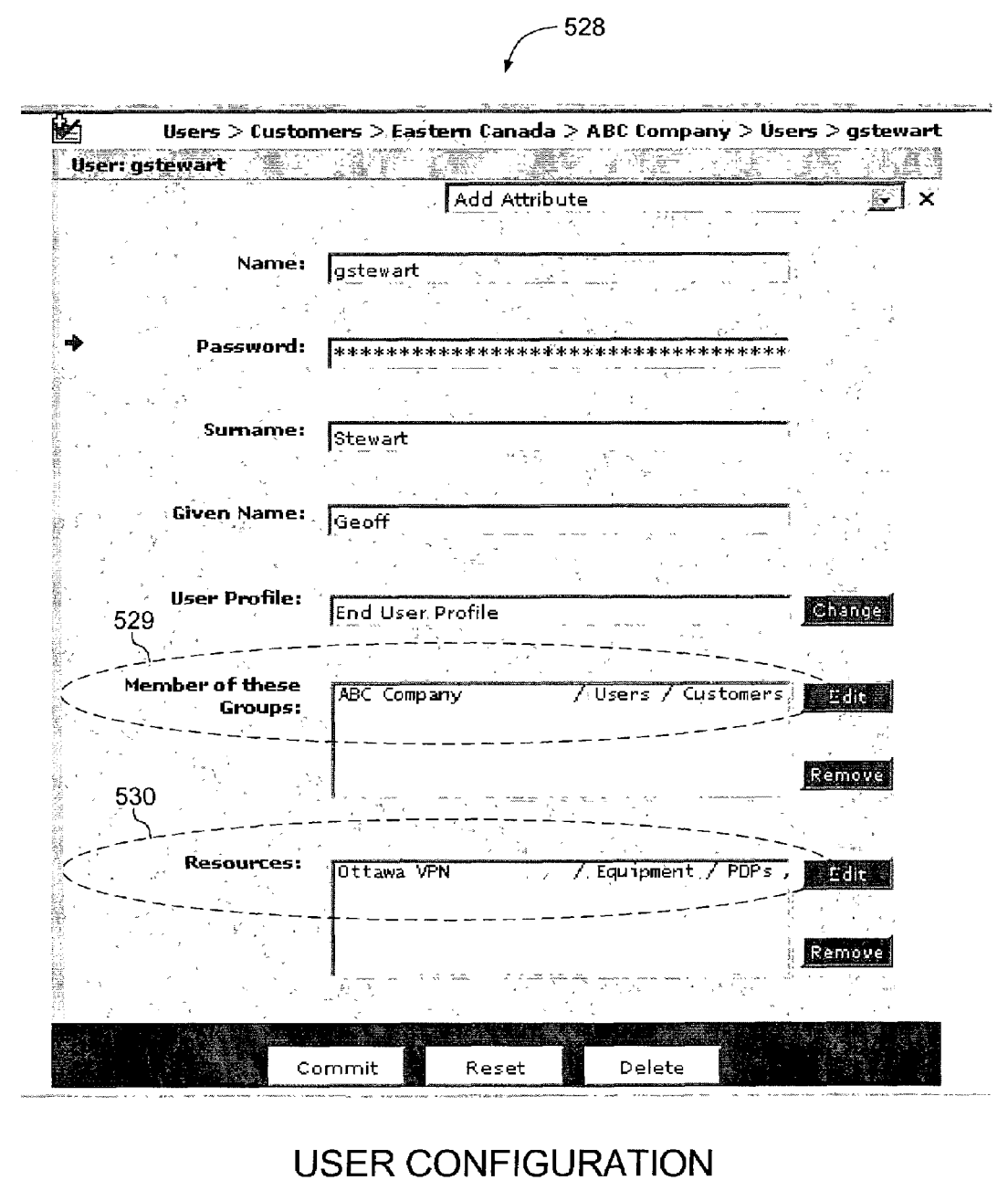

FIG. 8 shows a screen 528 in which an account for user 102 has been created (here the account is named gstewart). Field 529 is used to list the user groups of which user 102 is a member. "User group" is a configuration parameter used later to differentiate various service offerings. Those specific devices (resources) that user 102 could possibly use are associated with user 102 in field 530. In this example, the system administrator 115 associates the "Ottawa VPN" server with user 102 by selecting that server from among a pop-up list in field 530 of all resources to which carrier #1 can provide network-based services.

The system administrator 115 then configures the input engine 118 of the xAuthority core server 116 to set up a user self-activating "service description" (step 202). (For general information on service descriptions, see prov. app. Ser. No. 60/354,268, p. 344). The process begins with configuring (step 203) how, upon running the input engine 118 (step 207), the service will later be offered or "published" to a user. At step 203, the service is not yet linked to any specific user; that is performed later in step 207. The service description consists of a service, commercial terms and configuration parameters (commercial terms and configuration parameters together are called "attributes"). Examples of configuration parameters that are used to define a "service description" are username and password. (Although a user with an associated password has not yet been linked to a service description in step 202, the fact that a password will be required is configured in step 202.) Other configuration parameters, such as user group and time of day of the service, are used to define a "service offering" later in step 206.

Multiple service descriptions can make use of the same service driver and thereby offer the same actual service. This would be the case when different groups of users are offered the same actual service, but at different times and at different prices. In step 203, the system administrator 115 configures input engine 118 by adding publication rules that define which commercial terms and configuration parameters are to be retrieved from operational support systems and how those terms are to be displayed when the service offering is published to a user.

Figure 9:
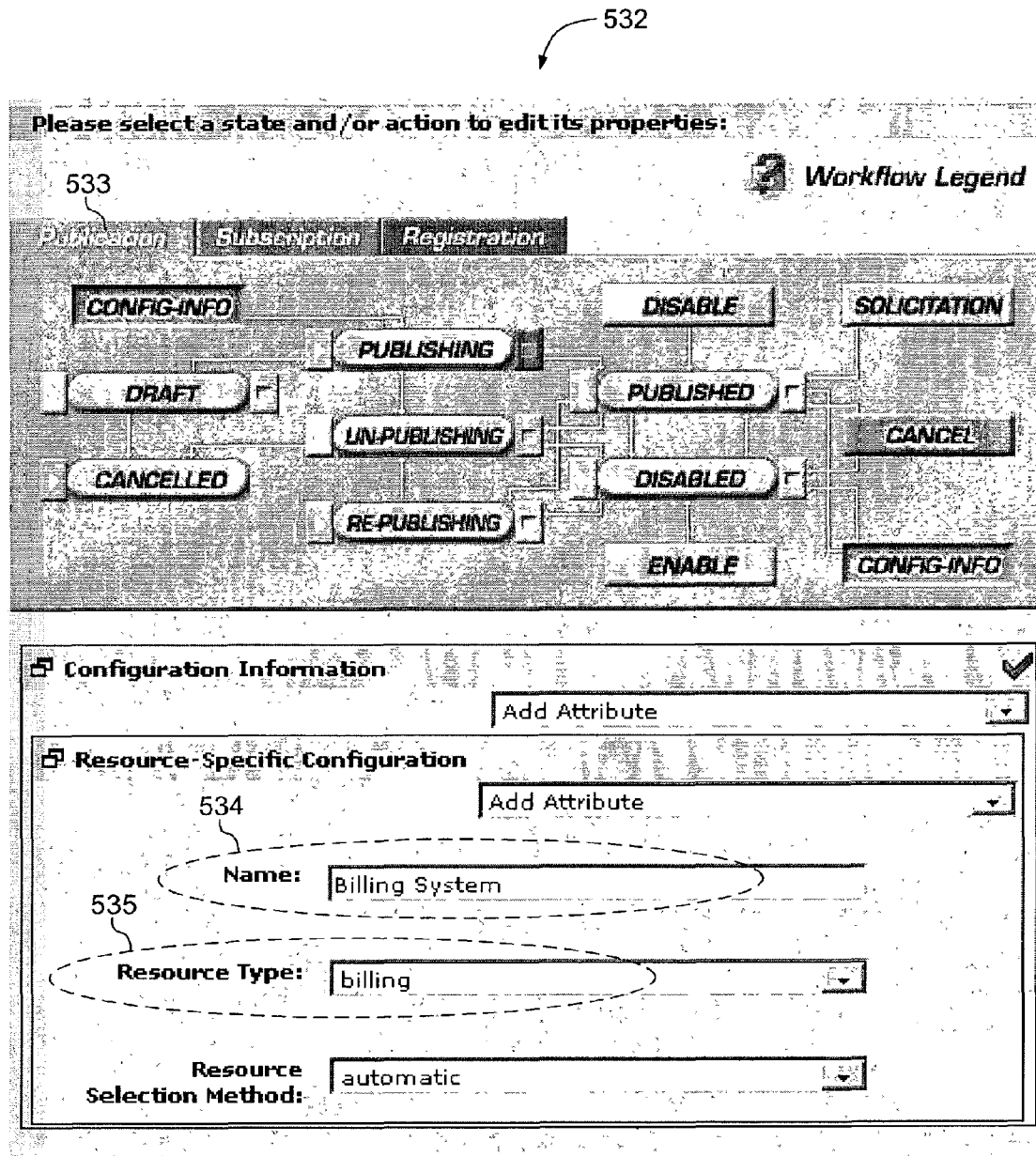
FIGS. 9–11 are screenshots taken from substep 203 in which publication rules are defined.

FIG. 9 shows a screen shot of the administrative web interface 125 of the xAuthority system at step 203 of setting up the VPN service for user 102. FIG. 9 shows a screen 532 for listing service drivers that will be used in the publication configuration step 203. Screen 532 is showing the Publication tab 533. On screen 532, the service driver object 308 for the billing system is being identified. By step 203, service driver object 308 has already been created and configured, so the system administrator 115 can use that service driver by simply typing into fields 534 and 535 the name and type, respectively, of the resource that the input engine 118 will later generate using service driver object 308. In this case, a "billing" type resource will be generated. In another embodiment, a pop-up window appears in field 534, and "Billing System" can be selected from among possible names of resources that are each associated with a pre-configured service driver object.

Figure 10:
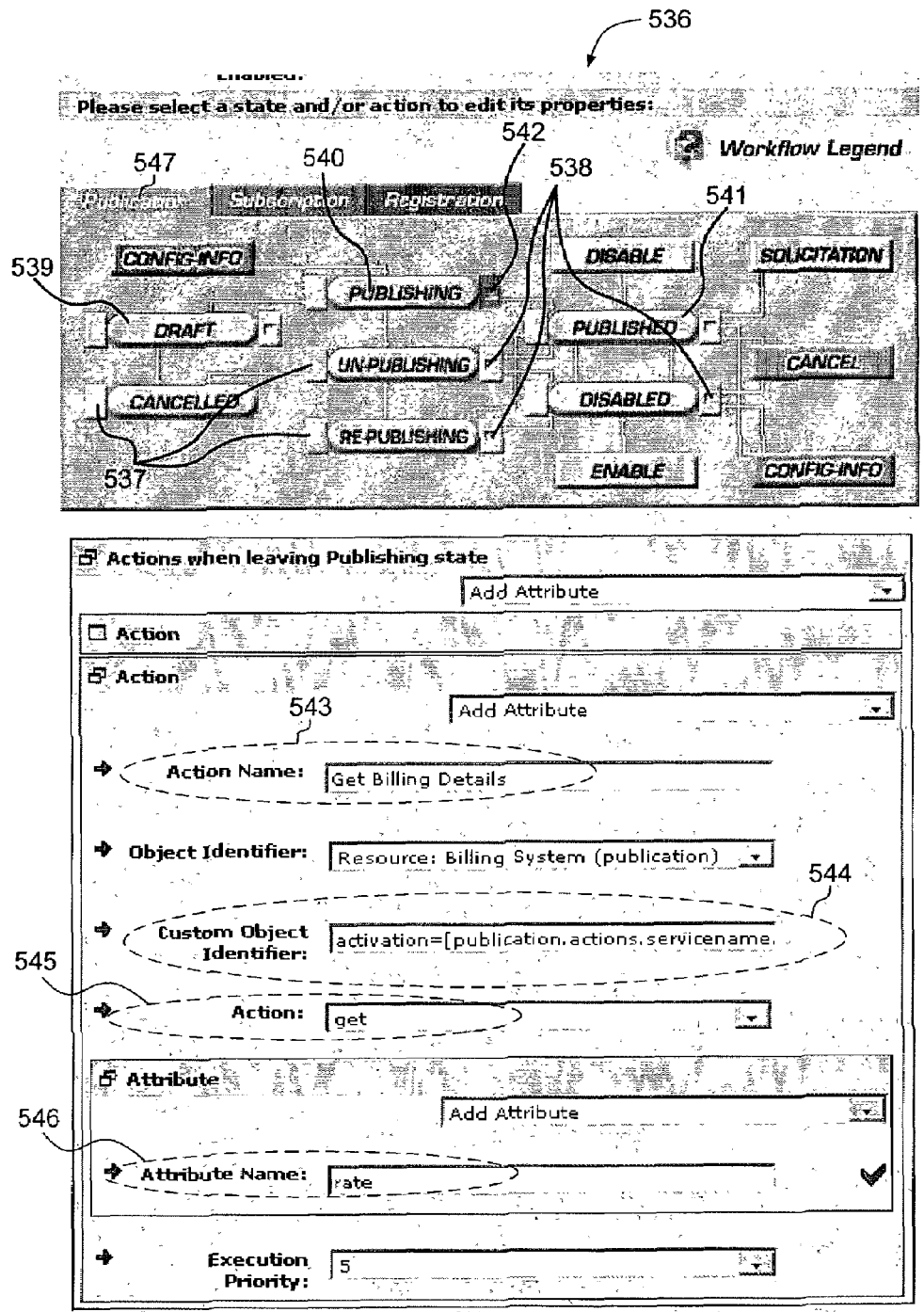

FIG. 10 shows a screen 536 for defining actions within the Publication tab 547 to be performed later in step 207 upon entering (triangles 537) a state and leaving (squares 538) a state. Examples of "states" are DRAFT 539, PUBLISHING 540 and PUBLISHED 541. On screen 536, an action (signified by darkened square 542) is being defined to be performed after the PUBLISHING state. The actions that are performed before and after the PUBLISHING state are preparatory to actually showing a user an offer for a service offering in the PUBLISHED state. Actions usually communicate via service drivers.

A GET action 545 is shown in FIG. 10 named "Get Billing Details" 543. The action is a billing event and will communicate using service driver object 308 and the resource object 309 for the billing system after the state PUBLISHING 540 has been completed. The action will retrieve an attribute, which is the commercial term price, here named "rate" 546. Later in step 207, the input engine uses service driver object 308 and the resource object 309 to create an activation object 314 identified in field 544. In step 207, the activation object is sent by the input engine 118 via the secure network 121 through PDP 124 to billing system 122 to retrieve the commercial term value (price), which will then be shown ("published") to user 102 as part of a service offering as configured by the actions defined to be performed before and after the state PUBLISHED 541.

Figure 11:
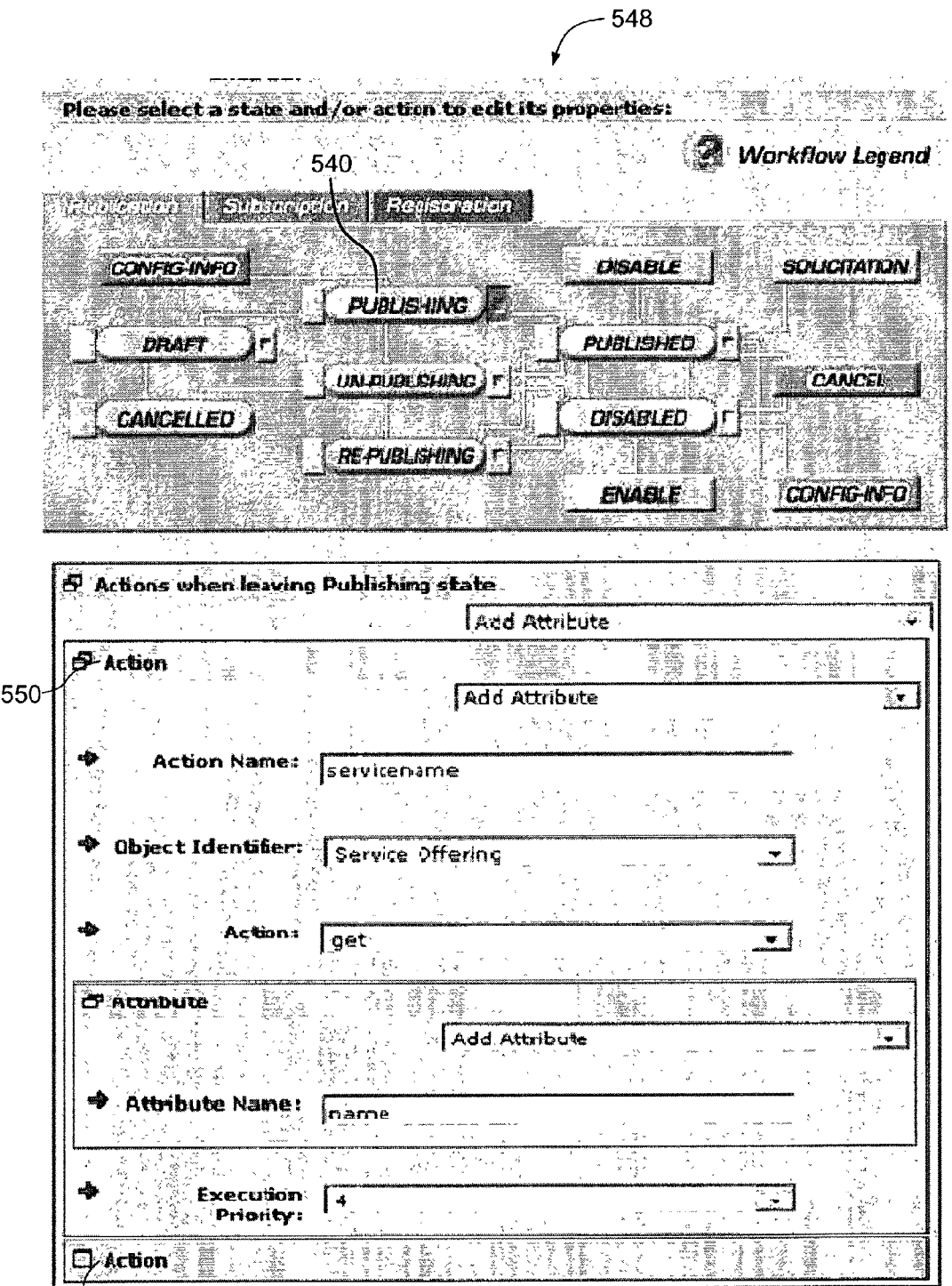

FIG. 11 shows a screen 548 in which a second action is being defined to be performed after the PUBLISHING state 540. The upper portion of screen 548 is the same as the upper portion of screen 536; the action defined in screen 536 is hidden from view on tab 549 behind the action defined on screen 548, which is seen on tab 550. The second action configures the input engine to get the (marketing) name of the service offering that will be shown to user 102. This action does not require a service driver because the service offering name will be retrieved from the input engine itself when that name is defined in a later step (step 206). (For more information on defining service descriptions, see prov. app. Ser. No. 60/354,268, p. 129).

In step 204, subscription rules are defined for how a user can accept a service offering. (Service offerings, as opposed to service descriptions, are defined later in the configuration step 206.) In our example, a user may be asked whether he qualifies for a 50% discounted price A because he is a member of a pre-defined user group. The input engine 118 can be configured to check the user database 117 to confirm a user's membership. A user can be asked to choose the service offering "Daytime VPN Service" for price B, or the service offering "Nighttime VPN Service" for price C, or both. The input engine 118 can be configured to check the billing system 122 to show a current price B and price C, each of which can be changed dynamically in the billing system 122. Then a user can be prompted to buy a specific service offering or offerings. The input engine 118 can be configured to check a user's creditworthiness in the CRM system 123 and to generate a billing event if, when the input engine is run in step 207, a user has successfully subscribed to a service offering.

Figure 12:
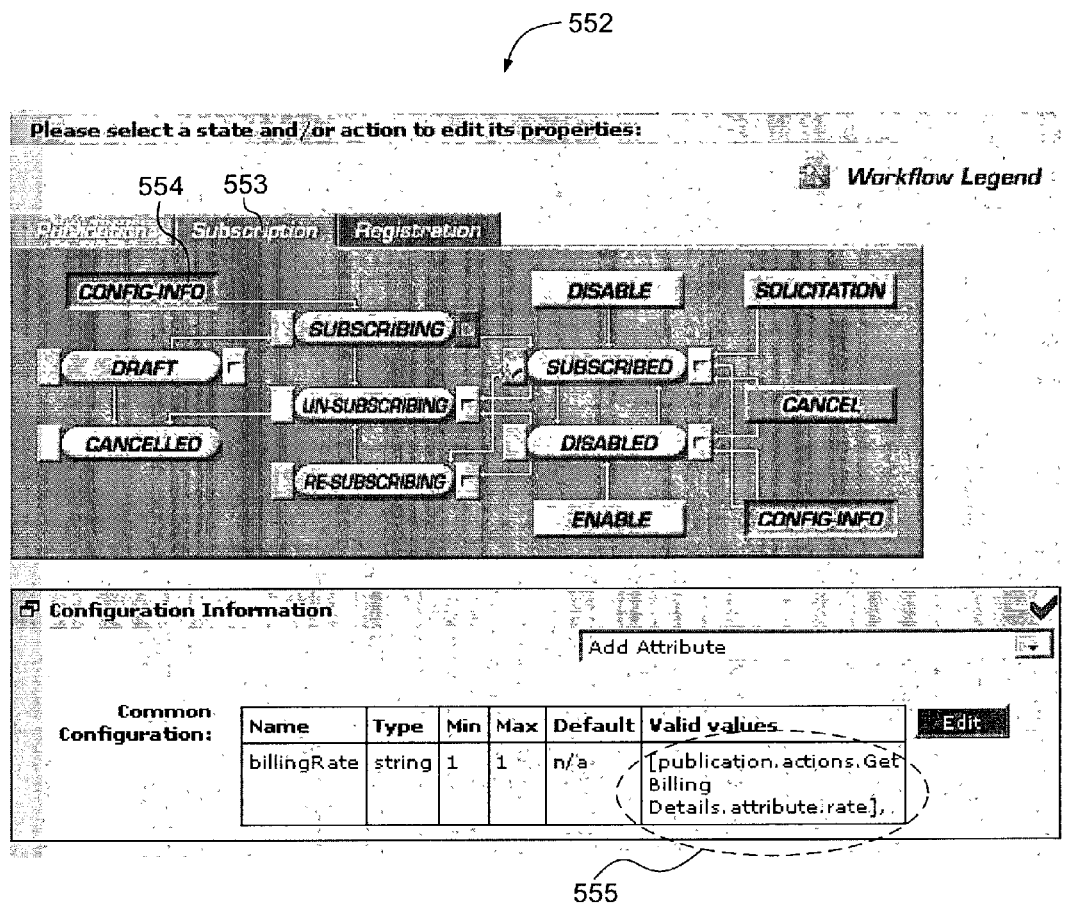
FIGS. 12–14 are screenshots taken from substep 204 in which subscription rules are defined.

FIG. 12 shows a screen shot of the administrative web interface 125 at step 204 of setting up the VPN service for user 102. FIG. 12 shows a screen 552 that is opened to the Subscription tab 553. Within the Subscription tab 553, the CONFIG-INFO button 554 is clicked, so that configuration information appears in the table at the bottom of screen 552. The table is an interface to an XML document. The configuration information on screen 552 describes how the commercial term price, which was obtained as the attribute "rate" 546 in action 543 (Get Billing Details) in FIG. 10, will be displayed to user 102 when the input engine is run in step 207. Inputs in square brackets, such as the bracketed description 555 on screen 552 of previously defined action 543 and rate attribute 546, are interpreted by the input engine to be pre-defined information that the input engine will retrieve upon running.

Figure 13:
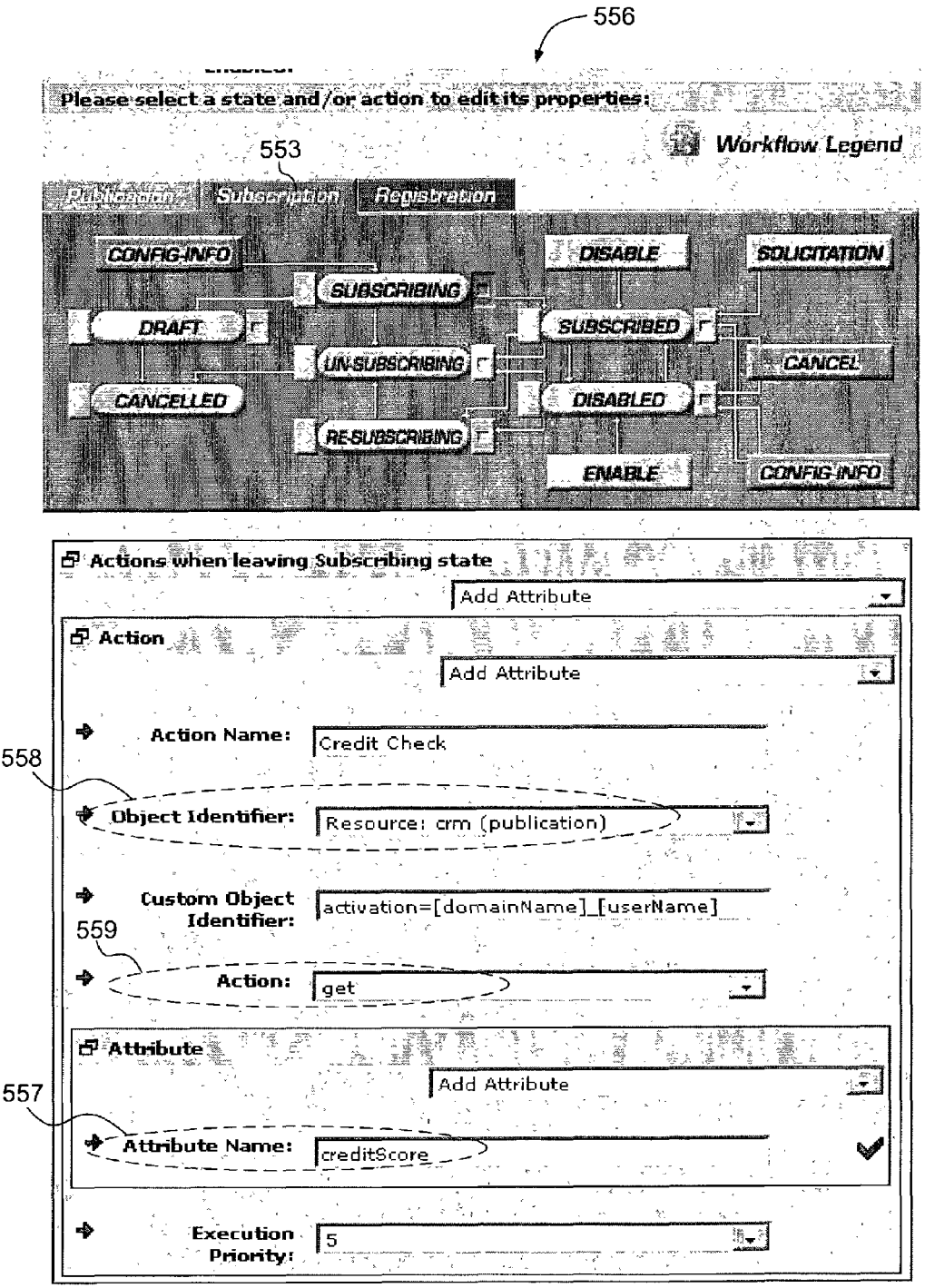

In FIG. 13, screen shot 556 is still opened to the Subscription tab 553. Screen 556 shows a GET action 559 being defined after the SUBSCRIBING state. After user 102 has been offered to buy VPN service at a price "rate" 546, the input engine will retrieve the credit score 557 of user 102 from the CRM system 123. The resource object 315 for the CRM system is identified on screen 556 in the object identifier field 558.

Figure 14:
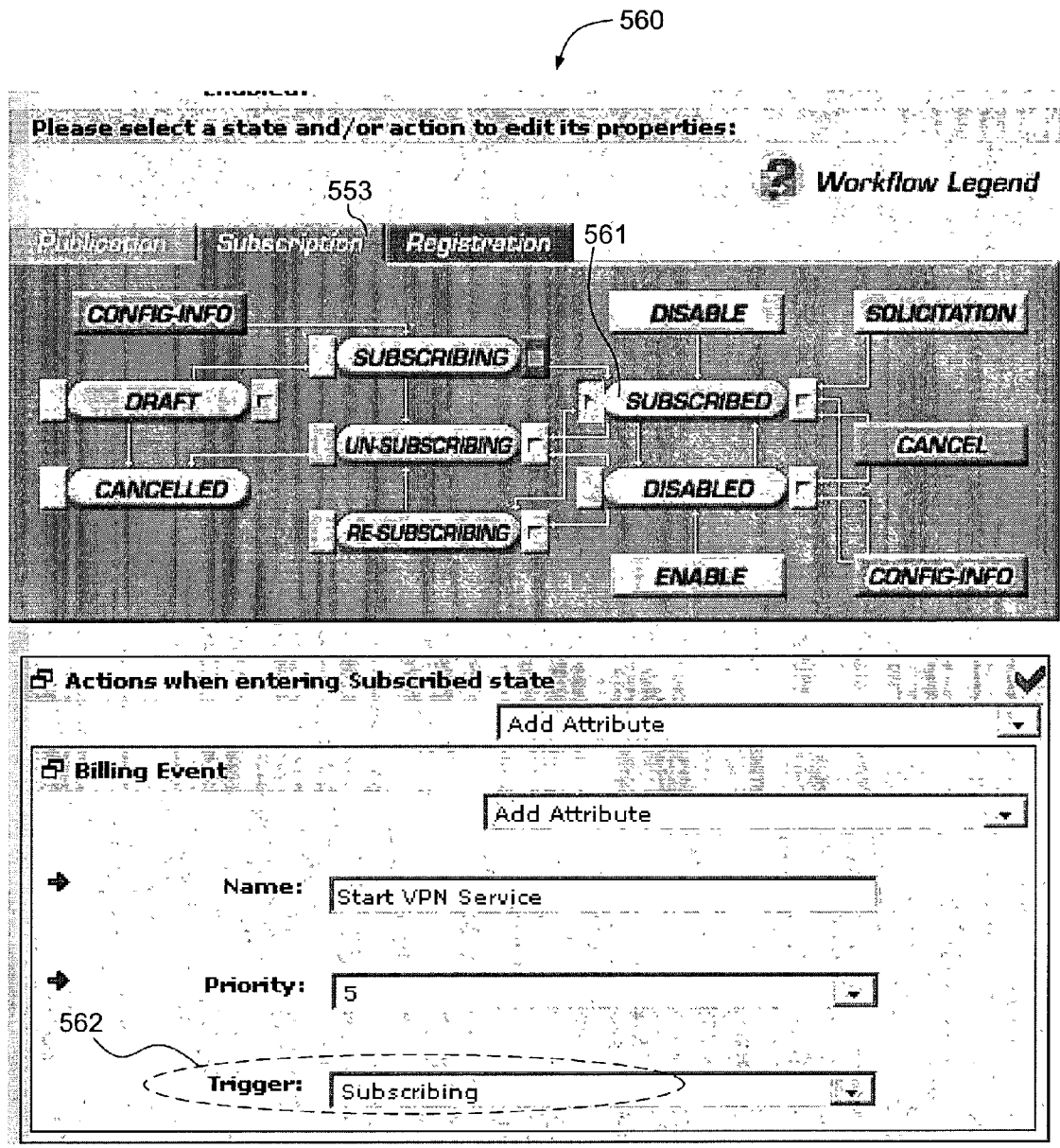

FIG. 14 shows a screen shot 560 in which an action is being defined to be performed before the SUBSCRIBED state 540. Screen 560 is still opened to the Subscription tab 553. The action is the creation of a billing event named "Start VPN Service." The work flow can reach the SUBSCRIBED stated from both the SUBSCRIBING state and the RE-SUBSCRIBING state. To avoid multiple billing of user 102 each time user 102 asks for a new configuration of his VPN service, the trigger 562 of the billing event is being configured to occur only when the SUBSCRIBED state is reached from the SUBSCRIBING state.

In step 205, "Defining Registration Rules", the configurable input engine 118 is configured to obtain additional information used to deliver the service offering. The input engine 118 uses the previously configured service drivers to determine which particular physical devices will be necessary to deliver the service offering. In our example, the input engine 118 is configured to retrieve the IP address of the VPN server that will be associated with a user that is linked to the service description in a later step. The input engine is also configured to prompt a user for attribute values that will be used to deliver the service offering, such as a user's preferred username and password.

Figure 15:
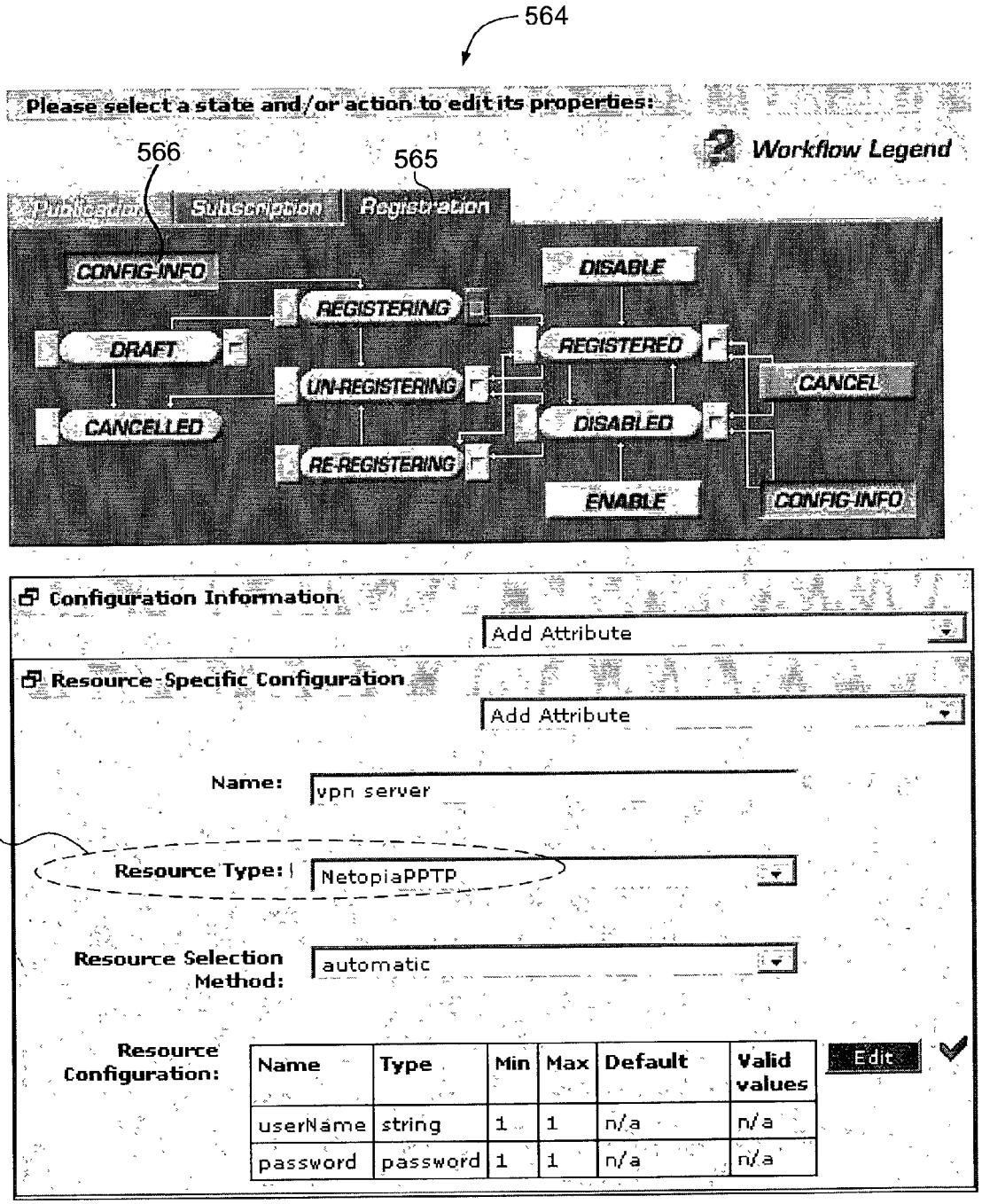
FIGS. 15–17 are screenshots taken from substep 205 in which registration rules are defined.

FIG. 15 shows a screen shot 564 of the administrative web interface 125 at step 205 of setting up the VPN service for user 102. The screen shot 564 is opened to the Registration tab 565, and the CONFIG-INFO button 566 is clicked, so that configuration information appears in the table at the bottom of screen 564. Screen 564 is a link to the service driver object 305 for a Netopia server. Service driver object 305 was already configured in step 200 and can be retrieved from the library of service drivers 126. The table at the bottom of screen 564 contains the configuration information that the Netopia VPN server requires in order to provide service, namely the username and password of a specific user.

Figure 16:
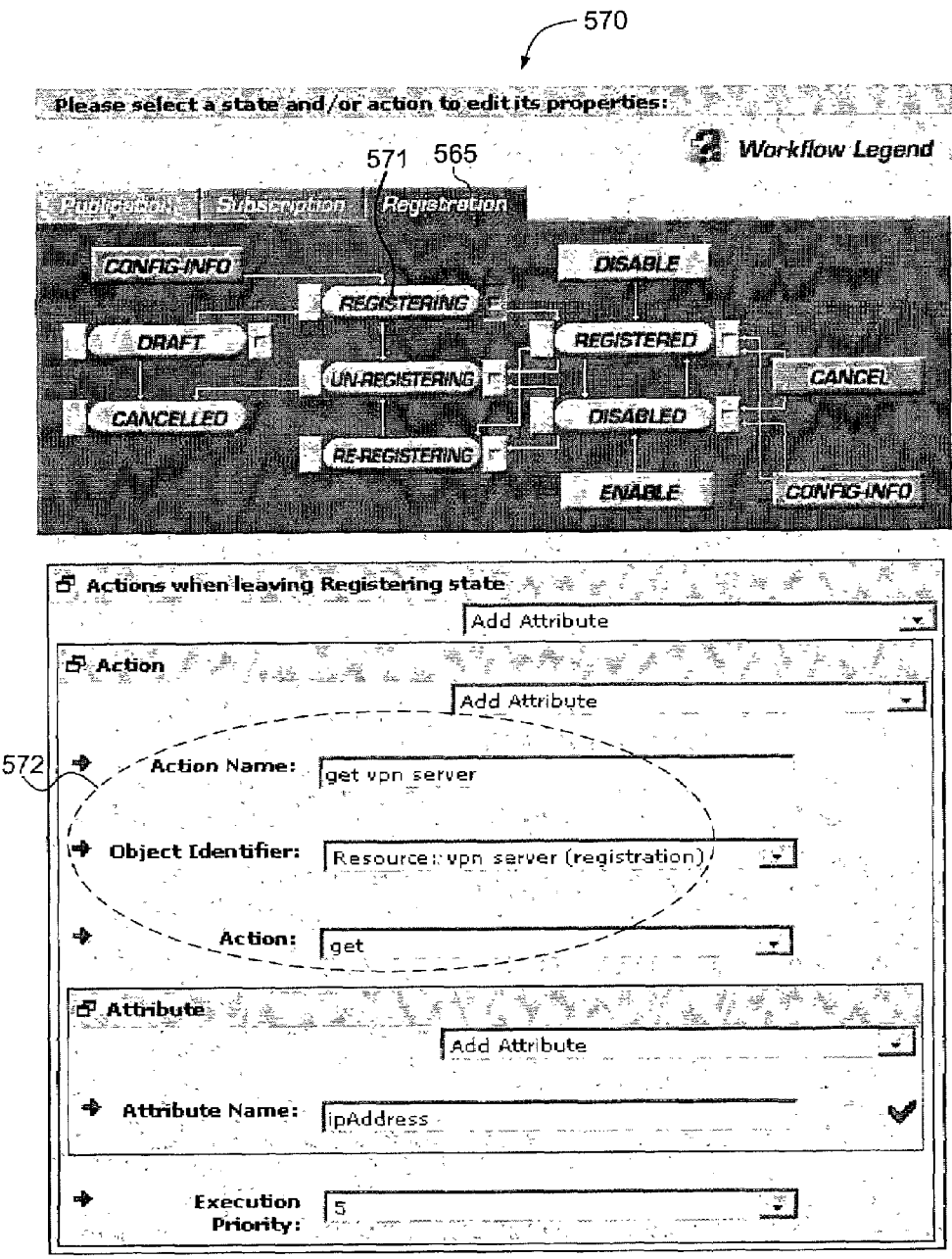

FIG. 16 shows a screen shot 570 in which an action is being defined to be performed after the REGISTERING state 571 within the Registration tab 565. Screen 570 shows a GET action 572 in which the input engine will retrieve the configuration parameter value "IP address" from the appropriate resource object. The computer 108 of user 102 uses the IP address of VPN server 113 in order to access VPN service. The input engine determines during step 207 when it is run that the correct resource object to provide VPN service to user 102 is resource object 306.

Figure 17:
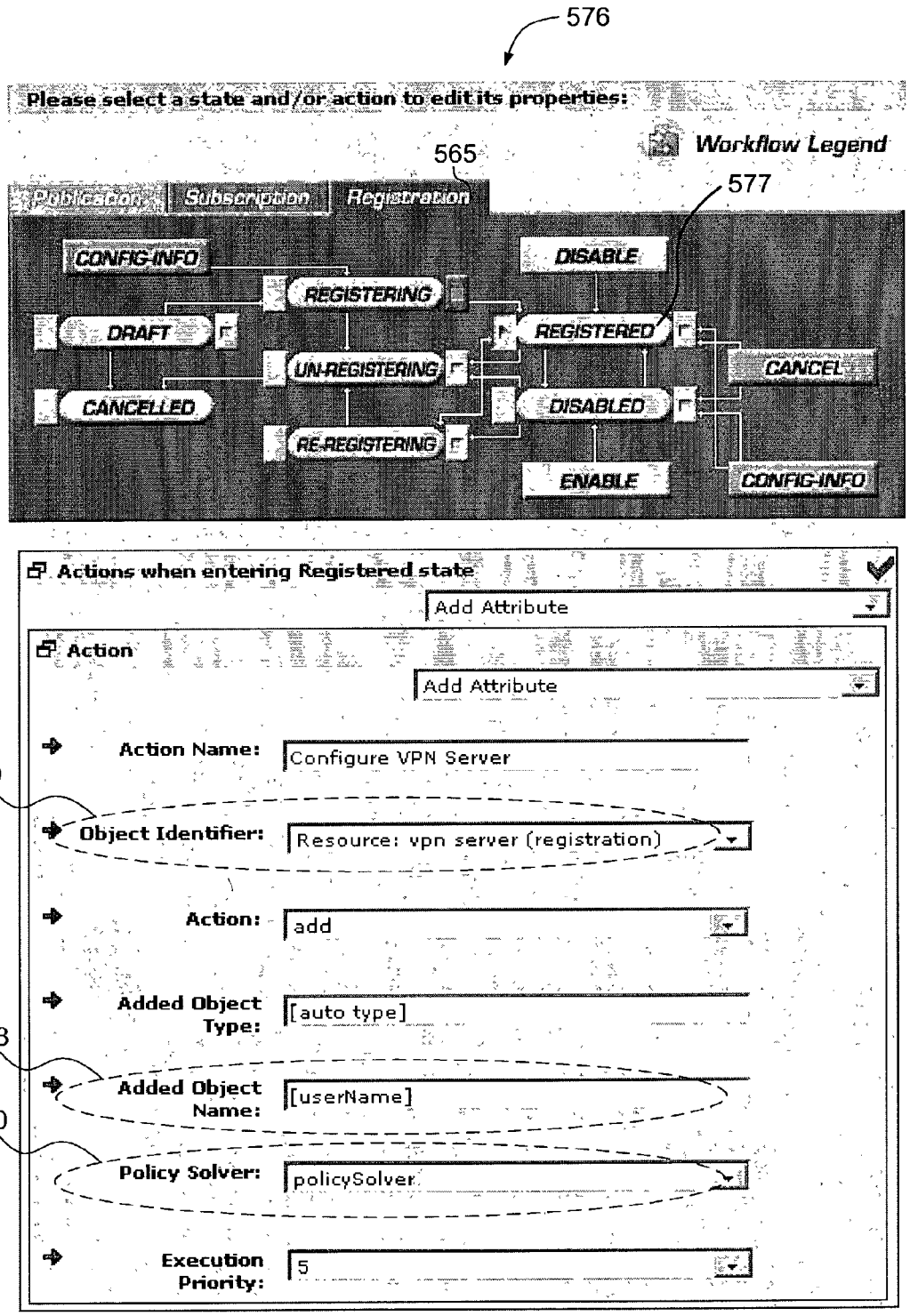

FIG. 17 shows a screen shot 576 in which an ADD action is being defined to be performed upon entering the REGISTERED state 577. Screen 576 is still opened to the Registration tab 565. The action is the creation of an activation object that will configure the VPN server 113 to enable user 102 to use the VPN service offering. On screen 576, the name of the activation object that has been added 578 is defined to be the user name assigned to user 102 in FIG. 8, namely "gstewart". Inputs to the input engine 118 that are contained in square brackets, such as the text that will be used as the activation object name 578, denotes pre-defined information that the input engine locates upon running.

In FIG. 17, the resource object that will be used to create the activation object is identified as "vpn server" 579. This resource object is the resource object first defined in action 572 in FIG. 16. When the input engine is run during step 207, the activation object 307 will be created and will contain the IP address of VPN server 113, as well as the username and password of user 102. Any special formatting requirements for activation objects that are sent to specific types of devices, such as Netopia VPN servers in our example, are contained in formatting programs called policy solvers. For example, a Netopia VPN server may require three attributes in a specific order, whereas a video server from another manufacturer may require a different number of attributes in another specific order. On screen 576, the name of the policy solver program that will be used by the input engine 118 to format the activation object 307 for user 102 is listed as "policySolver" 580. In this embodiment, a separate activation object is sent out by the xAuthority core server 116 to configure each device used to provide the service.

Once the service description has been defined in step 202, the system administrator 115 defines a service offering (step 206) by associating a service description with specific configuration parameters and specific billing rate codes. In our example, the configuration parameter "time of day" can be associated with the service description "VPN service" to yield the service offering "Daytime VPN Service." "Daytime VPN Service" can be offered to users under more expensive billing rate code A than the rate code that applies to the same VPN service at night. The attribute "user group" can be associated with VPN service so that a second and less expensive rate code B applies to Daytime VPN Service if a user appears in the CRM system as a group member at the time the service offering is published to that user.

At the predetermined point in the process when a user is to be shown offered prices A, B and C that were defined in step 204, the input engine will go to the billing system 122 to get the prices associated with the billing rate codes A, B and C. Different users will be shown different prices for the same service description because service offerings are defined by associating one or more service descriptions with different rate codes for different users. The prices associated with the billing rate codes are updated directly in the billing system 122 by other personnel of carrier #1. The updated prices are displayed to users without requiring any new configuration of the input engine.

Figure 18:
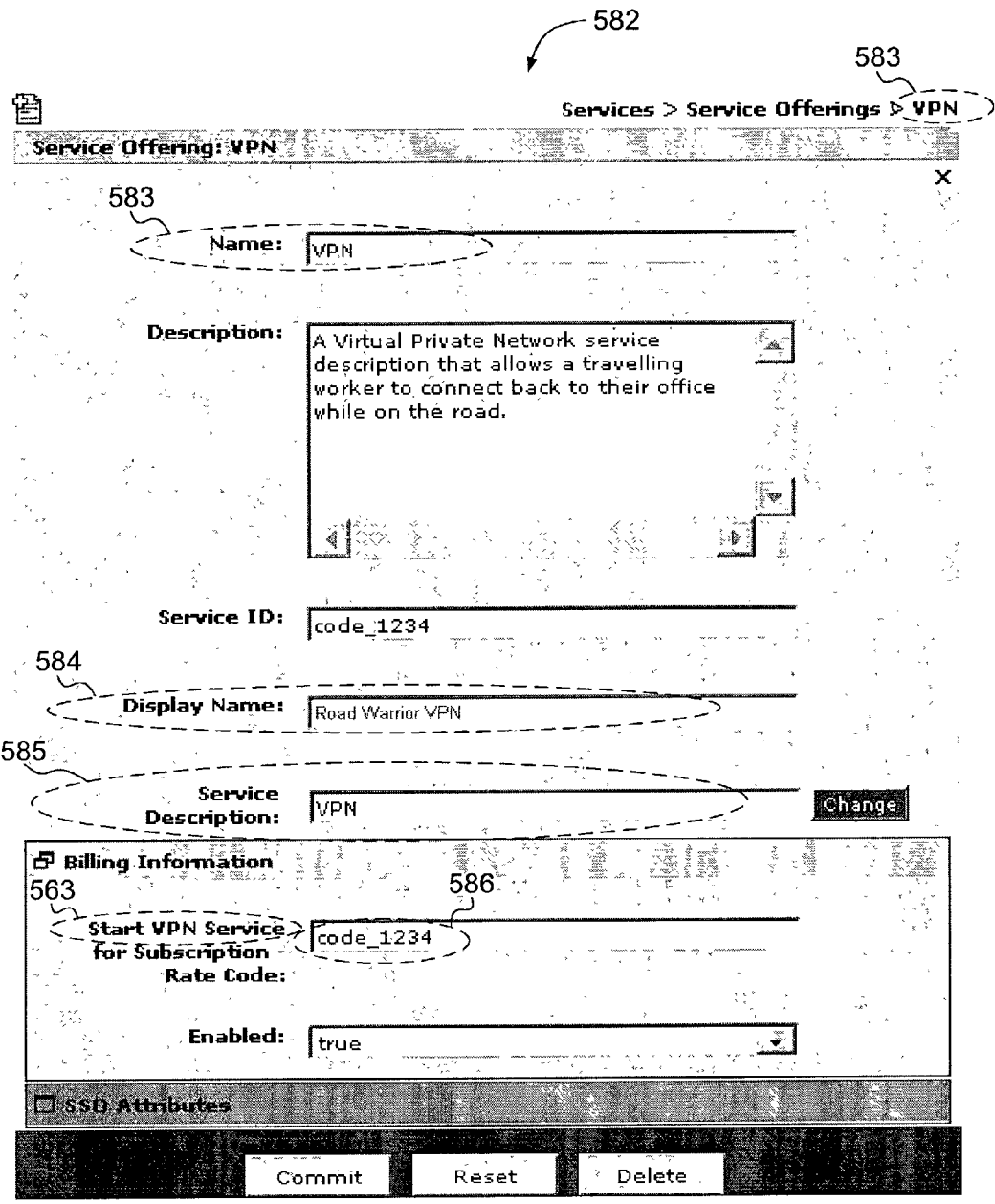
FIG. 18 is a screenshot taken from step 206 in which service offerings are defined.

FIG. 18 shows a screen shot 582 of the administrative web interface 125 at step 206 of setting up the VPN service for user 102. On screen 582, a service offering object is defined and given the name "VPN" 583. Note that the service offering may be offered to a user under a different marketing name, such as "Road Warrior VPN" 584. The system administrator 115 is prompted for a billing rate code to be associated with the billing event "Start VPN Service" 563 that was created on screen 560 in FIG. 14. In this embodiment, a service offering consists of a service description that is associated with specific billing rate codes. On screen 582, the service offering object VPN 583 is being linked to the service description object "VPN" 585, which was configured in the input engine as shown in FIGS. 6–17. Service offering object VPN 583 is also being linked to billing rate code "code__1234" 586, which in our example could represent billing rate codes A, B or C described above.

After the input engine has been configured, the input engine is run in step 207, and the actions set up by the XML documents in steps 202 and 206 are carried out.

Figure 19:
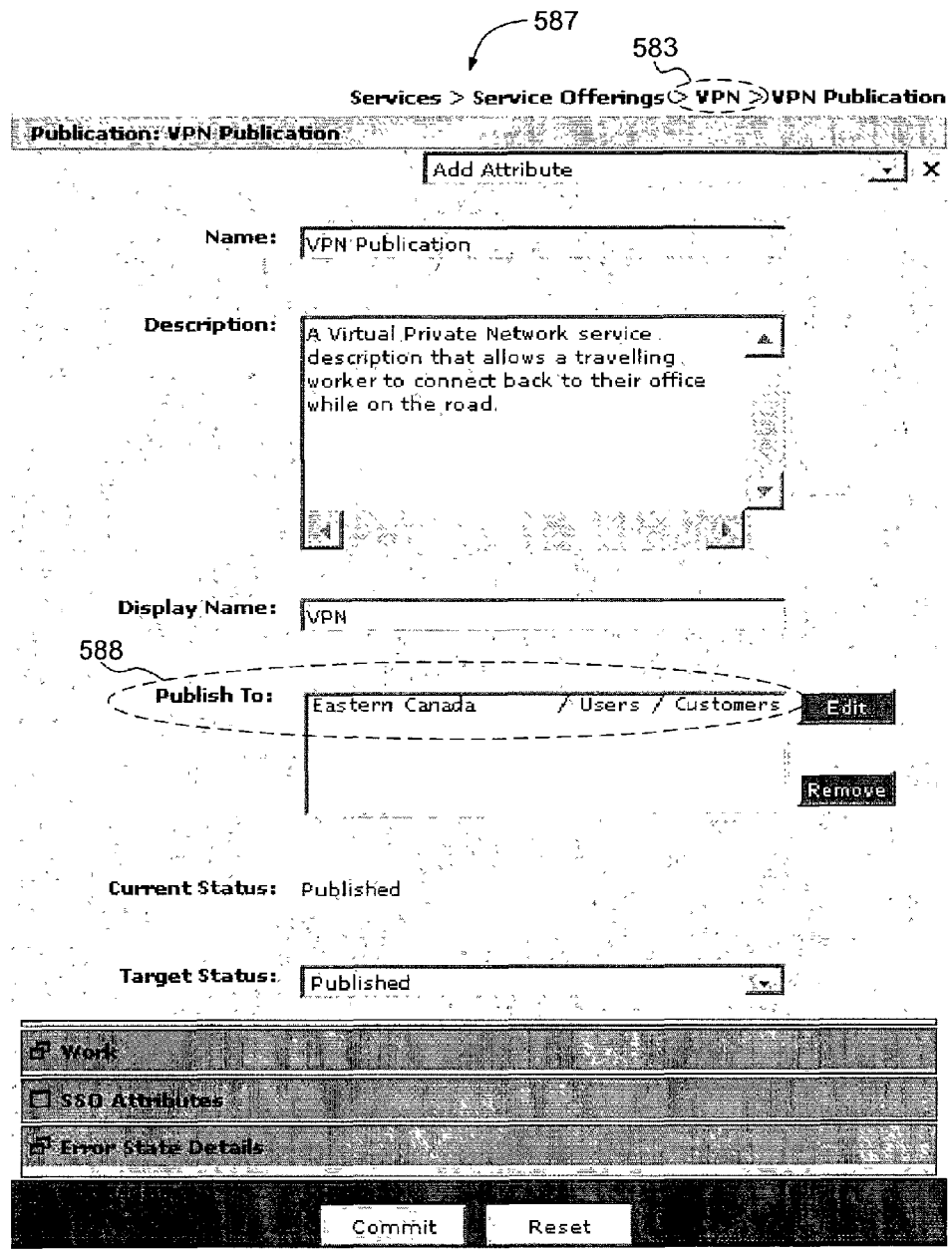
FIG. 19 is a screenshot taken from substep 208 in which the configurable input engine is run to publish service offerings to users.

FIG. 19 shows a screen shot 587 of the administrative web interface 125 at the Publication substep 208 of step 207. The Publication substep 208 sets up how a service offering will be presented to a prospective user. In substep 208, the configured input engine prompts the system administrator to define the users to whom a service offering will be offered (published). On screen 587, the system administrator 115 defines that the service offering "VPN" 583 will be published to the user group "Eastern Canada/Users/Customers" 588, of which use 102 is a member. In substep 208, the configured input engine 118 also retrieves the value of the commercial term price by referencing the pre-defined billing code in the billing system 122. In doing so, the input engine 118 is executing GET action 545 shown in FIG. 10 that was defined in step 203.

Upon the conclusion of step 202 "Defining a Service Description", step 206 "Defining a Service Offering" and the Publication substep 208 of step 207, a parent service description object, a child service offering object and a child service publication object, respectively, have been created. On screen 587 the service publication object "VPN Publication" is created under its parent service offering object named "VPN" 583. Upon completion of step 208, all of the XML documents associated with the screen shots in FIGS. 6–19 have been generated and/or configured, and the configuration of the configurable input engine is complete (step 209).

In the Subscription substep 210 of step 207, a service is offered to a user. FIG. 20 shows a screen shot 562 of the administrative web interface 125 at the Subscription substep 210 of step 207. The input engine 118 is run by the system administrator 115 to set up user self-activating services as well as by end users to self-activate network-based services. In both cases, screen pages enabling interaction with the input engine 118 are served up by the portal server 109. The xAuthority core server 116 sends XML messages to the portal server 109 that enable the portal server to serve up screen pages to the administrative web interface 125. FIGS. 6–19 are screen shots of the pages served up by the portal server to the administrative web interface 125. The portal server 109 also functions as an interface for end users, the screen pages being displayed to user 102 by browser 107. The portal server 109 serves up a marketing version of screen shot 562 to browser 107. The marketing version would include company logos of carrier #1 and advertising images.

Screen 562 of FIG. 20 shows four service offerings being offered to user 102. User 102 can click the boxes next to the service offerings he wishes to subscribe to and then click a subscribe button 563. In our example, user 102 has clicked on the service offering "Road Warrior VPN". Once user 102 clicks either of the subscribe buttons 563, the input engine retrieves the value of the commercial term credit score from the CRM system. In doing so, the input engine 118 is executing GET action 559 shown in FIG. 13 that was defined in step 204.

FIG. 21 shows screen 566 that is served up to user 102 if the retrieved credit score is acceptable. Screen 566 shows the value of the commercial term price, here $49.95, that the input engine retrieved in substep 208. Screen 566 displays the final offer, including contractual fine print. User 102 can accept the final offer by clicking the "I Accept These Terms" button 567. As with screen shot 562, a marketing version of screen shot 566 can be served up to user 102 that would include company logos and advertising images.

Figure 22:
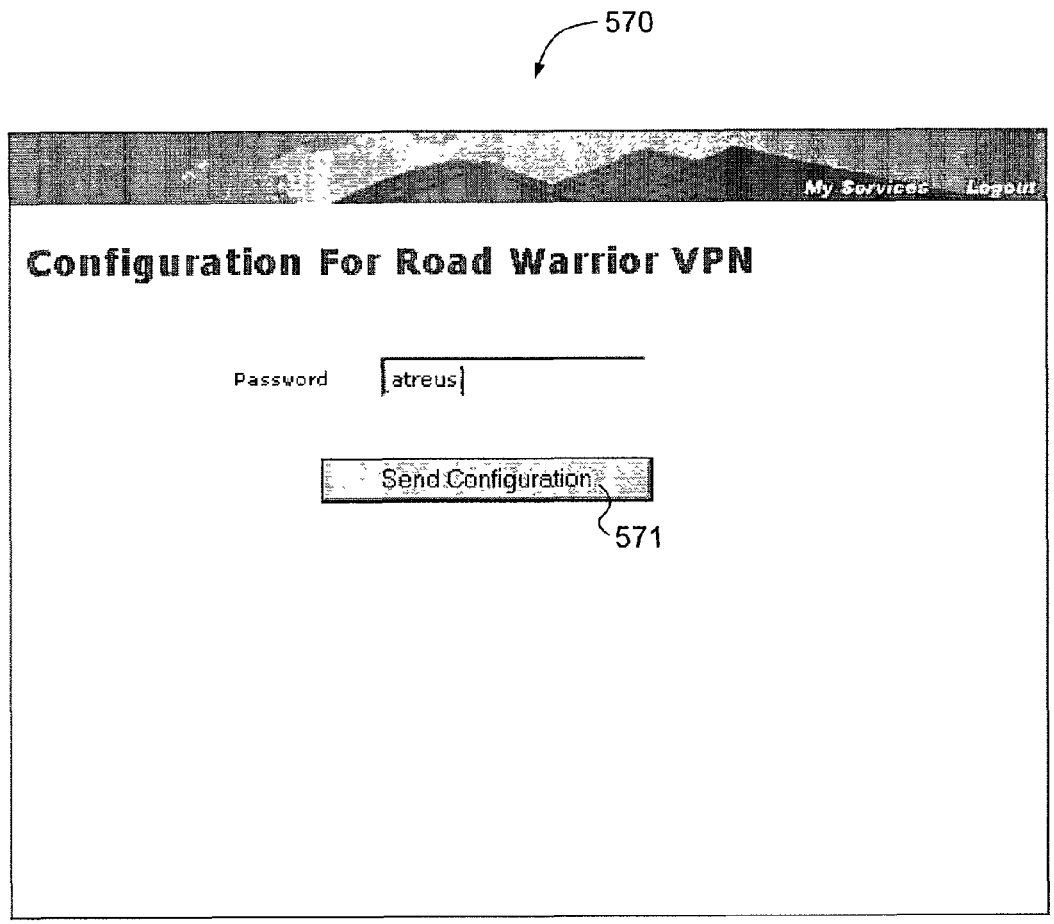
FIGS. 22–23 are screenshots taken from substep 211 in which the configurable input engine is run to set up services to which users have subscribed.
Figure 23:
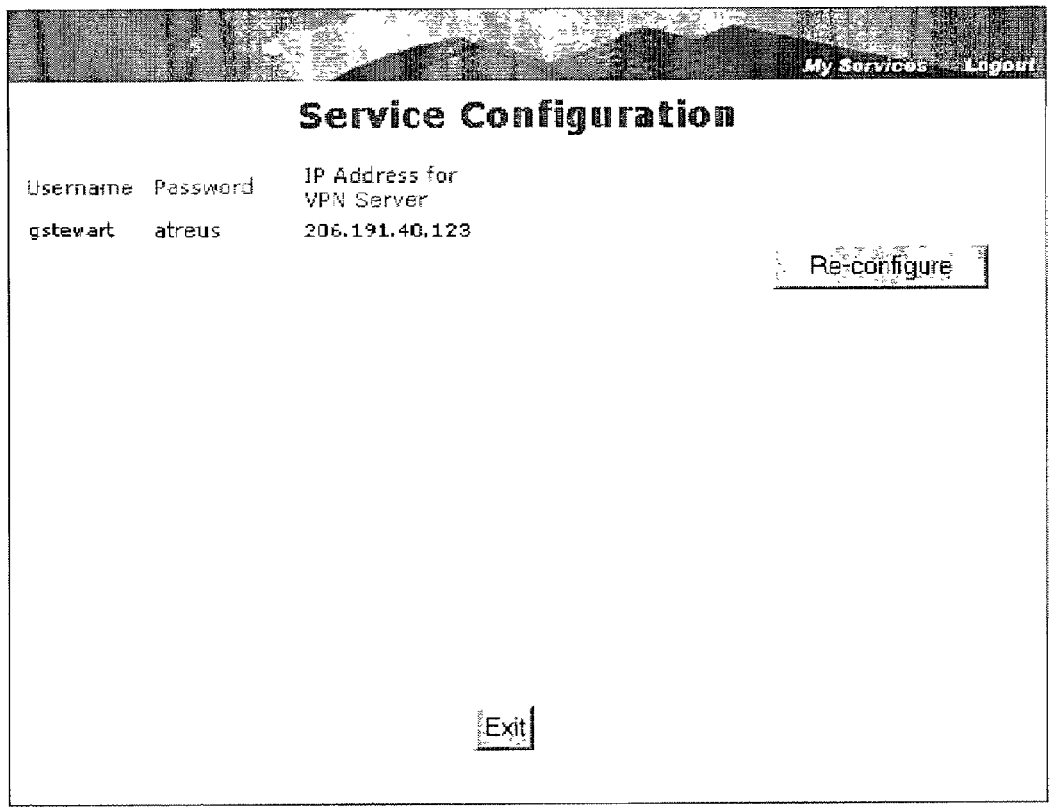

Before the Registration substep 211 of step 207, the user 102 has already accepted the offer to subscribe to the service offering described on screens 562 and 566. In Registration substep 211 of step 207, user 102 is prompted to choose a password that will be used to provide VPN service. FIG. 22 shows screen shot 570, on which user 102 has chosen "atreus" as his password. By clicking on the "Send Configuration" button 571, user 102 instructs the input engine 118 to send the information used to set up the "Road Warrior VPN" service to which user 102 subscribed. User 102 thereby self-activates the VPN service. The input engine 118 performs the GET action 572 defined in FIG. 16, in which the input engine retrieves the value of the configuration parameter "IP address" for VPN server 113. In FIG. 23, the input engine confirms that a service has been configured by displaying to user 102 the user's username, password and the IP address for VPN server 113. This information 127 is stored in the user database 117. User 102 can exit the interface to the input engine by clicking on the "Exit" button.

At the conclusion of substep 211, the input engine 118 sets up the "Road Warrior VPN" service to which user 102 subscribed. The configurable input engine 113 outputs activations (step 212) written in XML that each contain information for setting up a specific service for one user to run on a specific device. In our example, the input engine outputs activation object 307, which contains information to configure VPN server 113 to provide VPN service to user 102. Where a service for one user requires more than one device, more than one activation object is generated.

Figure 4:
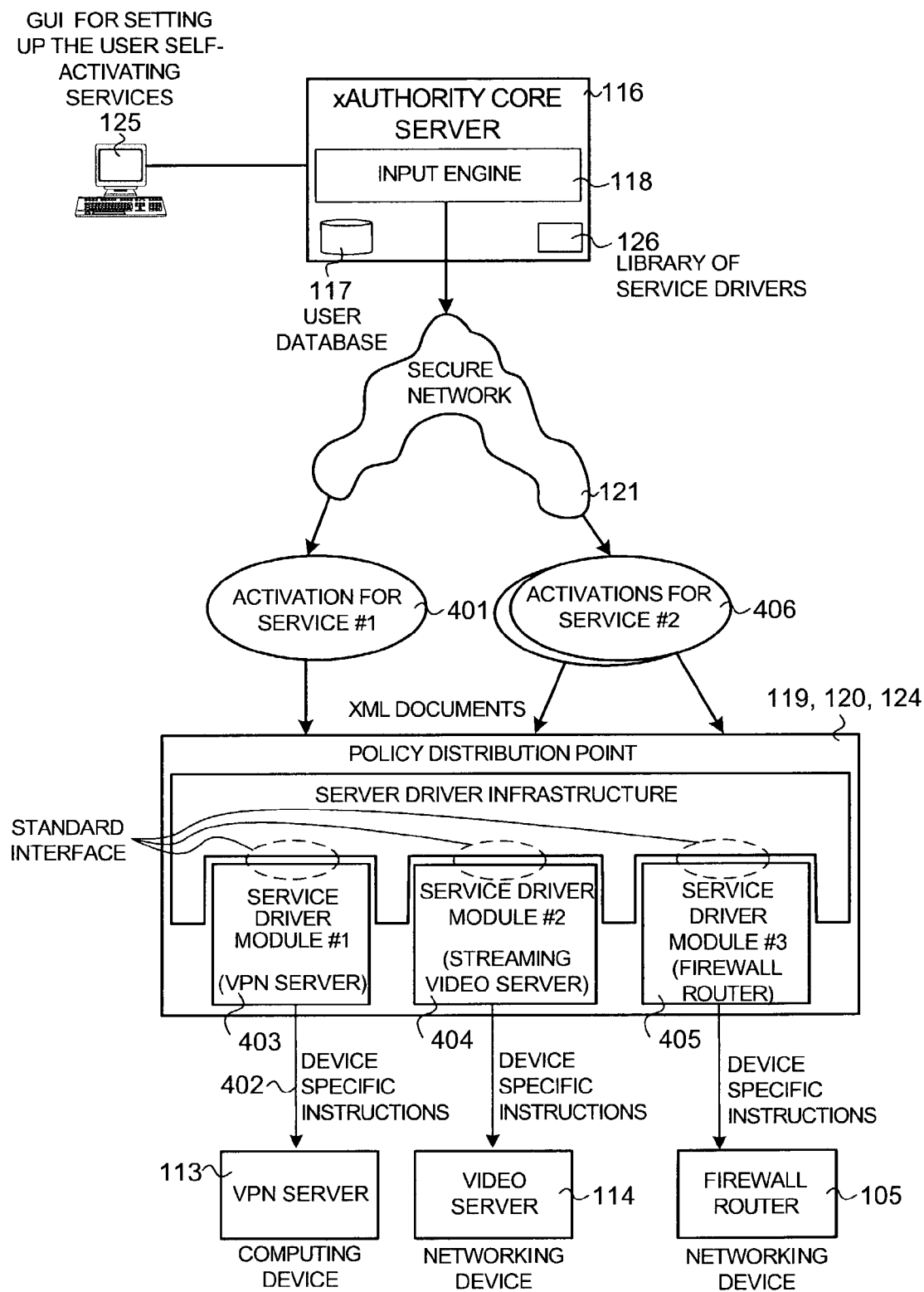
FIG. 4 is a diagram containing some of the components of FIG. 1 in larger scale and shows the path that activations travel.

FIG. 4 contains some of the elements of FIG. 1 in larger scale and shows the path that activations travel from the xAuthority core server 116 to the devices that are configured to set up various services. In our example, the activation object 307 is shown as activation 401. Activation 401 is output by the input-engine 118 and travels via the secure network 121 of carrier #1 to the appropriate policy distribution point (PDP). PDP 119, being in close physical proximity to VPN server 113, is the most appropriate PDP because the exposure of the information in activation 401, e.g., username and password, is exposed to the shortest path over the internet or broadband network 103, which are not secure.

PDPs translate activations from XML into machine-readable, device-specific instructions. This translation step is shown as step 213 in FIG. 2. In our example, activation object 307, shown as activation 401 in FIG. 4, is translated by service driver module #1 403 of PDP 119 into device-specific instructions 402. PDP 119 then sends the device-specific instructions 402 to VPN server 113, which is a networking device used to provide VPN service. In FIG. 2, step 214 involves sending the device-specific instructions to networking and/or computing devices that are used to provide the offered service. In step 215, the offered service is set up when the device-specific instructions configure the networking and/or computing devices that are used to provide the offered service.

For an additional user of a service for which all service drivers have previously been configured, a service can be set up by going through steps 201, 210 and 211. Service drivers are configured only once. In step 201, the system administrator 115 creates a user account in the user database 117 for the additional user. To provide VPN service to the additional user, for example, the system administrator 115 associates the Netopia VPN server in Ottawa 113 to the additional user. In this example, we assume that the additional user is in the same user group as is user 102. Therefore, the service is automatically published to the additional user. The service is offered to the additional user in step 210. The additional user has the opportunity to accept the offer to buy "Road Warrior VPN" service by clicking on the "subscribe" 563 and "I accept" 567 buttons, entering his chosen password and clicking the "send configuration" button 571. After the additional user clicks on the "I accept" button 567, the service is automatically set up. No additional configuring or programming by a technician or system administrator is necessary to set up the service.

Figure 5:
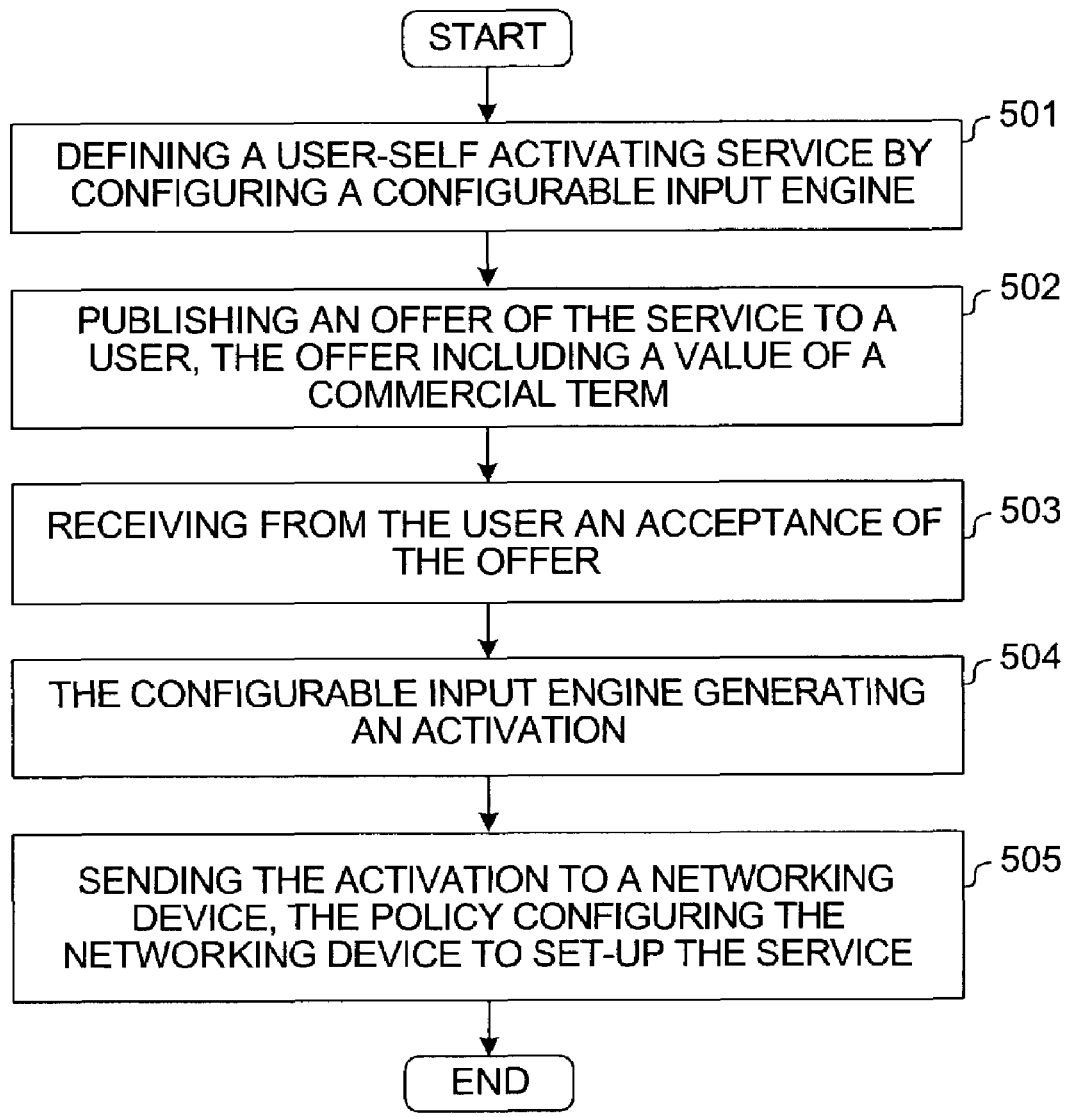
FIG. 5 is a flowchart of steps undertaken by an embodiment of the system shown in FIG. 1.

FIG. 5 is a flow chart of a method of a service creation process in accordance with an embodiment of the present invention. In step 501, a user self-activating service is defined by configuring a configurable input engine. Steps 200 through 209 in FIG. 2 illustrate a specific example of step 501.

Step 502 involves publishing to a user an offer of the service, including the value of a commercial term, such as price. Step 210 in FIG. 2 illustrates a specific example of step 502.

In step 503, an acceptance of the offer is received from the user. Steps 210 and 211 in FIG. 2 illustrate a specific example of step 503.

In step 504, the configurable input engine generates an activation. Steps 212 and 213 in FIG. 2 illustrate a specific example of step 504.

In step 505, the activation is sent to a networking device, and the activation configures the first networking device to set up the service. Steps 214 and 215 in FIG. 2 illustrate a specific example of step 505.

Set Up of Second Service (Streaming Video Through Firewall)

In this second example, carrier #1 (in FIG. 1) offers a service to user 102 that consists of access to streaming video through a firewall. The service is provided by using both a networking device, a firewall router, and a computing device, a video server.

The system administrator 115 creates and/or configures a service driver (step 200 in FIG. 2) for video server 114 and firewall router 105. Each service driver includes a service driver object, a resource object and an activation object. For example, the resource object for the firewall router 105 is shown as component 316 in FIG. 3.

In step 201, most of the information on user 102 has already been input into user database 117. In FIG. 8, however, the resource objects for the video server 114 in Cupertino and the firewall router 105 in Cupertino are added to field 530.

In Step 202, a service description for streaming video is defined analogously to the service description for VPN service. Billing events are defined for the streaming video service. In FIG. 15, an attribute is added in field 567 by choosing the resource object 316 for the firewall router in Cupertino 105. Then another attribute is added by choosing the resource object for the video server in Cupertino. In FIG. 16, a new GET action is defined that gets the IP address of video server 114. Another GET action is defined that gets the IP address of the firewall router 105. In FIG. 17, two new ADD actions are defined that configure video server 114 and firewall router 105.

In step 206, billing rate codes are linked to the service description defined for streaming video service in step 202. In FIG. 18, the service description "streaming video" is entered in field 585. Just as in the service creation process for VPN service, in substep 208, the configured input engine 118 retrieves the value of the commercial term price by referencing the pre-defined billing code in the billing system 122. How the service drivers, user information and service description are defined for streaming video service is another example of how step 501 can be performed.

In step 210, user 102 is able to pick streaming video from among the services available for subscription. In FIG. 20, the marketing name for streaming video service, e.g., "Video on Your desk", is published in the list of available services. FIG. 21 can include a list of video movies that user 102 can watch for the price listed opposite each movie. How the streaming video service is published to user 102 for subscription is another example of how step 502 can be performed.

Step 211 proceeds in the same way as for VPN service. User 102 can even chose the same password.

In step 212, the activations 406 for streaming video service are made up of two activation objects. This is an example of how step 504 can be performed. The activations 406 are sent to PDP 120, which is in close physical proximity to video server 114 and firewall router 105.

In step 213, a service driver module 405 translates an activation object 317 for firewall router 105 from XML into device-specific instructions in the form of HTML. A service driver module 404 translates an activation object for video server 114 from XML into device-specific instructions in the form of command line interface (CLI) commands. In step 214, the HTML and CLI commands are sent to the firewall 105 and video server 114 using HyperText Transport Protocol (HTTP) and Secure SHell (SSH), respectively. In step 215, the HTML and CLI commands configure those devices to set up the streaming video service for user 102. How the activation objects are sent to the video server and firewall to set up the streaming video service is another example of how step 505 can be performed.

In setting up the streaming video service, the input engine 118 reuses the recording of user information, billing configuration and CRM configuration performed when the VPN service was set up.

Compact Disc Appendix

The Compact Disc Contains:

A) a directory file AMP, 1.08 MB, written to disc Jun. 13, 2002; AMP contains 281 files that concern how service descriptions and service offerings are defined in steps 202 and 206 in FIG. 2. The files in directory AMP relate to the configuration of an xAuthority core server. For example, the file ampConfig.pl (83 KB, written to disc on Jun. 13, 2002) in the directory file AMP\bin covers how GET and SET actions are performed;

B) a directory file PORTAL, 2.71 MB, written to disc Jun. 13, 2002; PORTAL contains 855 files. The files in directory PORTAL relate to the functioning of a portal server that interfaces to an xAuthority core server;

C) a directory file XLINK, 1.77 MB, written to disc Jun. 13, 2002; XLINK contains 503 files. The files in directory XLINK relate to the main logic of the functioning of an input engine of an xAuthority core server. For example, the directory file XLINK\XLINK\Workflow (58.9 KB, written to disc on Jun. 13, 2002) in the directory file XLINK\XLINK contains the main files for implementing the actions used in steps of a service creation process shown in FIG. 2; and D) a file CD Appendix Title Page.txt, 366 bytes, written to disc Jun. 13, 2002.

Although the present invention has been described in connection with certain specific embodiments (for example, the documents incorporated into this patent document above) for instructional purposes, the present invention is not limited thereto. In some embodiments, an activation is sent to a PDP, is translated into device-specific instructions, and the device-specific instructions then pass through a portion of the internet on their way to a device to be configured, whereas in other embodiments the PDP is located in close proximity to the device to be configured such that the activation is sent to the PDP, is translated into device-specific instructions, and the device-specific instructions are sent to the device to be configured without the device-specific instructions ever passing over the internet. In a specific embodiment, a network-based service is offered to a customer using a plurality of devices, each communicating with the xAuthority core server through a separate PDP. A separate activation is sent to each PDP to configure the device connected to the PDP to set up the service for the customer. In some embodiments, a service driver is installed on a PDP before an activation is sent to the PDP. The activation is then translated by the service driver into device-specific instructions. In other embodiments, a service driver is sent to and installed on a PDP after an activation is sent to the PDP. After the service driver is installed on the PDP, it translates the activation into device-specific instructions.

Accordingly, various modifications, adaptations, and combinations of various features of the described embodiments can be practiced without departing from the scope of the invention as set forth in the claims.

What is claimed is:

1. A method, comprising:
   (a) defining a user self-activating service by configuring a configurable input engine;
   (b) publishing an offer of the service to a first user, the offer including a value of a commercial term;
   (c) receiving from the first user a first acceptance of the offer;
   (d) in response to (c) the configurable input engine automatically generating a first activation; and (e) sending the first activation to a policy distribution point, the policy distribution point translating the first activation to device-specific instructions and configuring a first networking device to set up the service.

2. The method of claim 1, further comprising:
(f) publishing the offer of the service to a second user;
(g) receiving from the second user a second acceptance of the offer;
(h) in response to (g) the configurable input engine automatically generating a second activation; and
(i) sending the second activation to the policy distribution point, the policy distribution point translating the second activation and configuring a second networking device to set up the service.

3. The method of claim 2, wherein the first networking device is the second networking device.

4. The method of claim 1, further comprising:
(f) in response to (c) the configurable input engine automatically generating a third activation; and
(g) sending the third activation to the policy distribution point, the policy distribution point translating the third activation and configuring a computing device to set up the service.

5. The method of claim 1, wherein a first service driver is installed on the policy distribution point, the first activation being translated in the policy distribution point by the first service driver, the device-specific instructions being sent from the policy distribution point to the first networking device.

6. The method of claim 1, wherein when the first activation is sent in (e) to the policy distribution point, the policy distribution point does not have an installed service driver, a first service driver translating the first activation into device-specific instructions after the policy distribution point receives the first service driver, the device-specific instructions being sent from the policy distribution point to the first networking device.

7. A computer-readable medium having computer-executable instructions for performing steps comprising:
(a) defining a user self-activating service by configuring a configurable input engine;
(b) publishing an offer of the service to a first user, the offer including a value of a commercial term;
(c) receiving from the first user a first acceptance of the offer;
(d) in response to (c) the configurable input engine automatically generating a first activation; and
(e) sending the first activation to a policy distribution point, the policy distribution point translating the first activation to device-specific instructions and configuring a first networking device to set up the service.

8. The computer-readable medium of claim 7 having further computer-executable instructions for performing the steps of:
(f) publishing the offer of the service to a second user;
(g) receiving from the second user a second acceptance of the offer;
(h) in response to (g) the configurable input engine automatically generating a second activation; and
(i) sending the second activation to the policy distribution point, the policy distribution point translating the second activation and configuring a second networking device to set up the service.

9. A method, comprising:
(a) defining a service by inputting a commercial term and a configuration parameter into a configurable input engine, the service involving a networking device;
(b) using the configurable input engine to receive a value of the commercial term and to receive a value of the configuration parameter, the configurable input engine generating an activation;
(c) sending the activation to a policy distribution point;
(d) the policy distribution point translating the activation into a format understood by the networking device; and
(e) sending the translated activation to the networking device, the translated activation configuring the networking device to set up the service.

10. The method of claim 9, wherein the configurable input engine has a high level graphical user interface, and wherein a user uses the graphical user interface to define the service without doing any computer programming.

11. The method of claim 10, wherein the user uses the graphical user interface by picking selected ones of a plurality of graphically illustrated steps, execution of the selected steps resulting in the value of the commercial term and the value of the configuration parameter being input into the configurable input engine.

12. The method of claim 11, wherein the activation is sent to the networking device in the form of device-specific instructions, the device-specific instructions being specific to the networking device.

13. The method of claim 9, wherein the commercial term is taken from the group consisting of: payment amount, payment method, duration of service, and frequency of payment.

14. The method of claim 13, wherein the commercial term is payment amount, and wherein the value of the commercial term is a payment amount.

15. The method of claim 9, wherein the configuration parameter is taken from the group consisting of: bandwidth requirement, username, password, IP address, and location.

16. The method of claim 15, wherein the configuration parameter is IP address, and wherein the value of the configuration parameter is an IP address.

17. A method, comprising:
(a) publishing a first user self-activating service to a first user;
(b) the first user subscribing to the first user self-activating service and thereby causing a configuration system to use a first service driver on a policy distribution point to engage in a first communication with a billing system, the configuration system then configuring a networking device and a computing device to activate the first user self-activating service;
(c) publishing a second user self-activating service to a second user; and
(d) the second user subscribing to the second user self-activating service and thereby causing the configuration system to use the first service driver to engage in a second communication with the billing system, the configuration system then configuring the networking device and the computing device to activate the second user self-activating service.

18. The method of claim 17, wherein the configuration system configures the networking device in (b) by communicating with the networking device using a second service driver, and
wherein the configuration system configures the networking device in (d) by communicating with the networking device using the second service driver.

19. A system for setting up user self-activating network-based services, comprising:
(a) a billing system;
(b) a networking device;

(c) a computing device, the networking device and the computing device comprising means for providing a network-based service to a first user;

(d) a core server, the core server comprising a configurable input engine, a user database and a library of service drivers, the configurable input engine comprising means for producing a service publication containing a description of an offer of a service, a value of a commercial term relating to the offer and the identity of the first user to whom the offer is made, the configurable input engine further comprising means for receiving an acceptance of the offer by the first user, the library of service drivers containing a first service driver for the billing system, a second service driver for the networking device and a third service driver for the computing device, the core server comprising means for producing a first activation, a second activation and a third activation; and (e) a policy distribution point (PDP), the PDP comprising means for receiving the activations and service drivers, using the service drivers to translate the activations into device-specific instructions and sending the device-specific instructions to the billing system, the networking device and the computing device, the device-specific instructions configuring the billing system, the networking device and the computing device to provide the network-based service to the first user.

20. The system of claim 19, further comprising a customer relationship management (CRM) system, the CRM system comprising means for providing the network-based service to the first user, the library of service drivers containing an additional service driver for the CRM system, the core server comprising means for producing an additional activation, the additional service driver translating the additional activation into additional device-specific instructions, the additional device-specific instructions configuring the CRM system to provide the network-based service to the user.

21. The system of claim 19, wherein the networking device and the computing device further comprise means for providing a network-based service to a second user, the configurable input engine further comprising means for producing a service publication containing the identity of the second user to whom the offer is made, the configurable input engine further comprising means for receiving an acceptance of the offer by the second user, the core server comprising means for producing a fourth activation, a fifth activation and a sixth activation, the fourth through sixth activations configuring the the billing system, the networking device and the computing device to provide the network-based service to the second user.

* * * * *